United States Patent
Inoue

(12) 
(10) Patent No.: US 6,172,770 B1
(45) Date of Patent: Jan. 9, 2001

(54) METHOD OF AND APPARATUS FOR CORRECTING HALFTONE-DOT IMAGE DATA, AND METHOD OF CORRECTING HALFTONE-DOT THRESHOLD DATA

(75) Inventor: Yoshiaki Inoue, Minamiashigara (JP)

(73) Assignee: Fuji Photo Film Co., Ltd., Kanagawa-ken (JP)

( * ) Notice: Under 35 U.S.C. 154(b), the term of this patent shall be extended for 0 days.

(21) Appl. No.: 09/165,805

(22) Filed: Oct. 2, 1998

(30) Foreign Application Priority Data

Oct. 3, 1997 (JP) .................................................. 9-271626

(51) Int. Cl.[7] .............................. G06K 9/40; G06T 5/10; G06T 5/50; H04N 1/409
(52) U.S. Cl. ........................... 358/1.9; 382/275; 358/454; 358/463
(58) Field of Search ........................... 358/1.9, 454, 533, 358/298, 299, 463; 282/275, 456; 382/264, 260, 261

(56) References Cited

U.S. PATENT DOCUMENTS 5,121,445 * 6/1992 Tsujuchi et al. ...................... 358/454

FOREIGN PATENT DOCUMENTS

0195563 * 9/1986 (GB) .
8-317212 11/1996 (JP) ............................... H04N/1/405
9-200518 7/1997 (JP) ............................... H04N/1/405
9-331452 12/1997 (JP) ............................... H04N/1/407

* cited by examiner

Primary Examiner—Scott Rogers
Assistant Examiner—Gholam A. Behpour
(74) Attorney, Agent, or Firm—Sughrue, Mion, Zinn, Macpeak & Seas, PLLC

(57) ABSTRACT

Halftone-dot image data in a position space is converted into data in a frequency space by fast Fourier transform unit, and data including low-frequency noise components whose frequency is lower than the fundamental frequency component of halftone dots is extracted from the data in the frequency space by a low-pass filter. The extracted data including the frequency noise components is inversely converted into image data in the position space by an inverse fast Fourier transform unit. Pixels of the halftone-dot image data in positions which correspond to pixels including the noise components in the inversely converted image data are corrected by a corrector such that the noise components will be reduced. The correcting process is in the position space, and can simply be carried out. A binary halftone-dot image generated from the corrected halftone-dot image data is substantially free of any moire pattern which would otherwise be caused by an interference between the output resolution of an image output device and the frequency of halftone dots.

22 Claims, 22 Drawing Sheets

F I G. 10
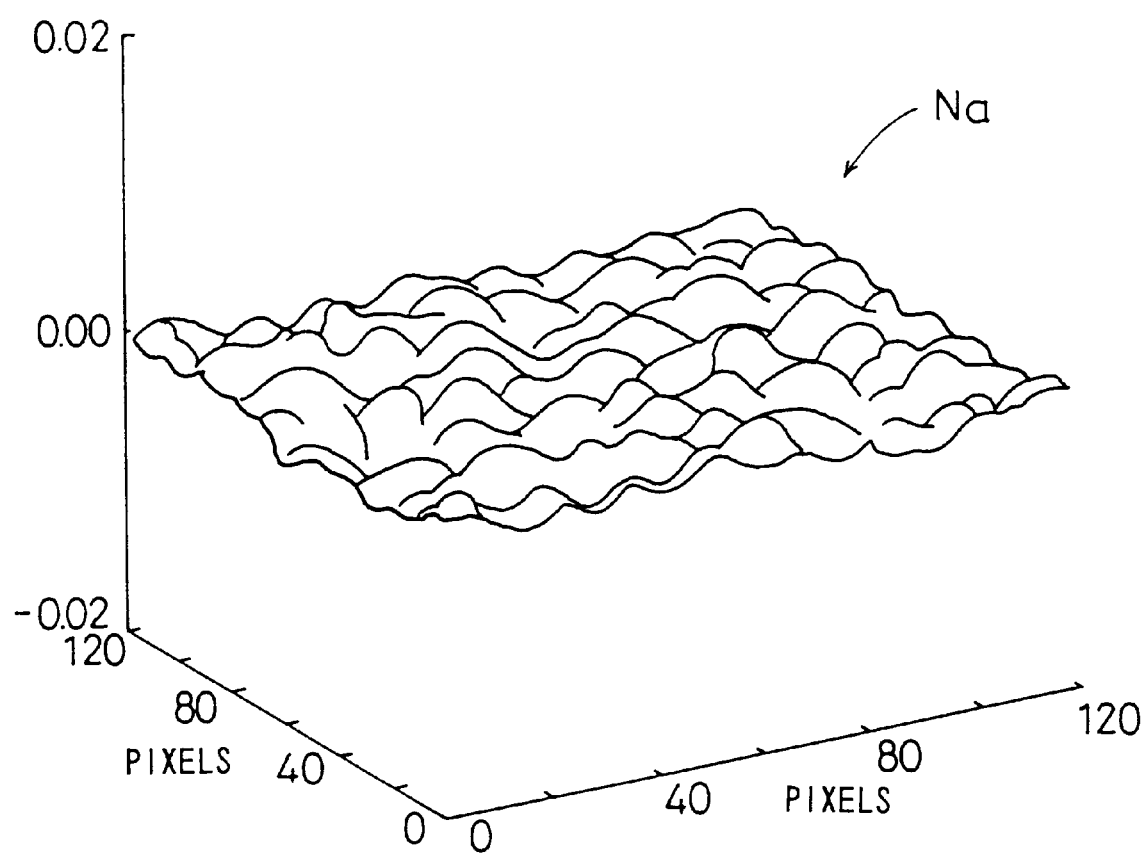

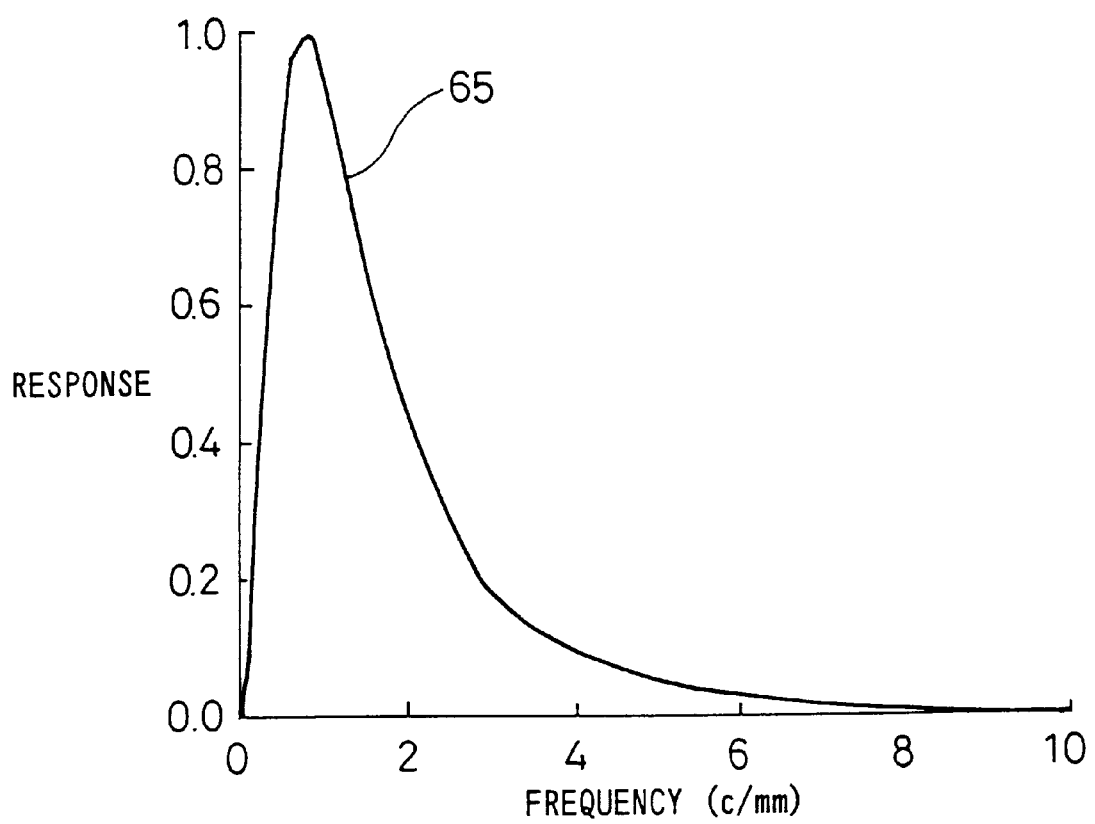
F I G. 11

F I G. 20
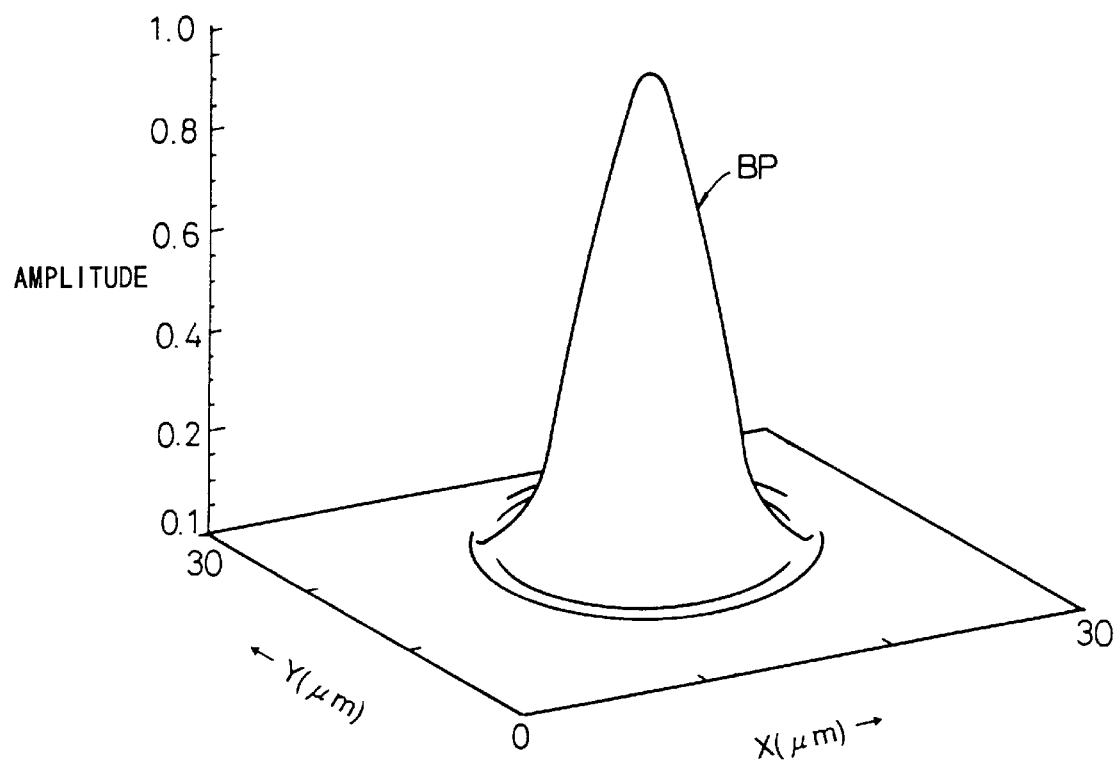

METHOD OF AND APPARATUS FOR CORRECTING HALFTONE-DOT IMAGE DATA, AND METHOD OF CORRECTING HALFTONE-DOT THRESHOLD DATA

BACKGROUND OF THE INVENTION

1. Field of the Invention

The present invention relates to a method of and an apparatus for correcting halftone-dot image data in printing devices including color scanners, image setters, CTP (Computer To Plate) devices, copying machines, and DDCP (Digital Data Color Proofing) devices, and a method of correcting halftone-dot threshold data to generate halftone-dot image data.

2. Description of the Related Art

There are known halftone-dot image output devices such as image setters for forming binary halftone-dot images on a sheet of photographic paper or film by producing black and non-black spots with a laser beam that is selectively turned on and off. It has been pointed out that such halftone-dot image output devices tend to generate a moire pattern in an outputted image due to an interference between their output resolution and the screen ruling (see Japanese laid-open patent publication No. 8-317212).

The output resolution is the resolution of an image output device and is represented by dpi (dots per inch), pixels/inch (equivalent to dpi), or pixels/mm. The screen ruling is defined as lines/inch (which may be converted into lines/mm) representing the number of halftone dots (also referred to as "halftone-dot cells") per unit length (1 inch). The screen ruling is represented by lpi (lines per inch), the number of lines, a screen frequency, or a halftone-dot frequency.

The moire pattern generated due to an interference between their output resolution and the screen ruling is a periodic pattern of halftone dots, i.e., a periodic interference pattern produced between the halftone-dot pitch and the scanning line pitch. The moire pattern appears as low-frequency noise which reduces the quality of the outputted image.

The inventor of the present invention has proposed processes for reducing the low-frequency noise as disclosed in Japanese laid-open patent publication No. 8-317218 (hereinafter referred to as "first process") and Japanese laid-open patent publication No. 9-200518 (hereinafter referred to as "second process").

According to the first process, the array of threshold values, i.e., the positions of threshold values, in a threshold template (also called halftone-dot threshold data) used for generating binary halftone-dot image data are arranged to equalize the number of pixels to be blackened (non-blackened) in the threshold template as much as possible for reducing the low-frequency noise. According to the second process, random numbers are added when the threshold values are arrayed in the threshold template according to the first process for further reducing the low-frequency noise.

SUMMARY OF THE INVENTION

It is therefore an object of the present invention to provide a method of and an apparatus for correcting halftone-dot image data, and a method of correcting halftone-dot threshold data, for more effectively reducing low-frequency noise.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 10 is a diagram showing the low-frequency components in a position space as the binary halftone-dot image data after being corrected is subjected to a fast Fourier transform and then an inverse Fourier transform;

FIG. 11 is a diagram illustrative of characteristics of human vision;

FIG. 20 is a diagram illustrative of the simulated shape of a laser beam;

DETAILED DESCRIPTION OF THE PREFERRED EMBODIMENTS

Figure 1:
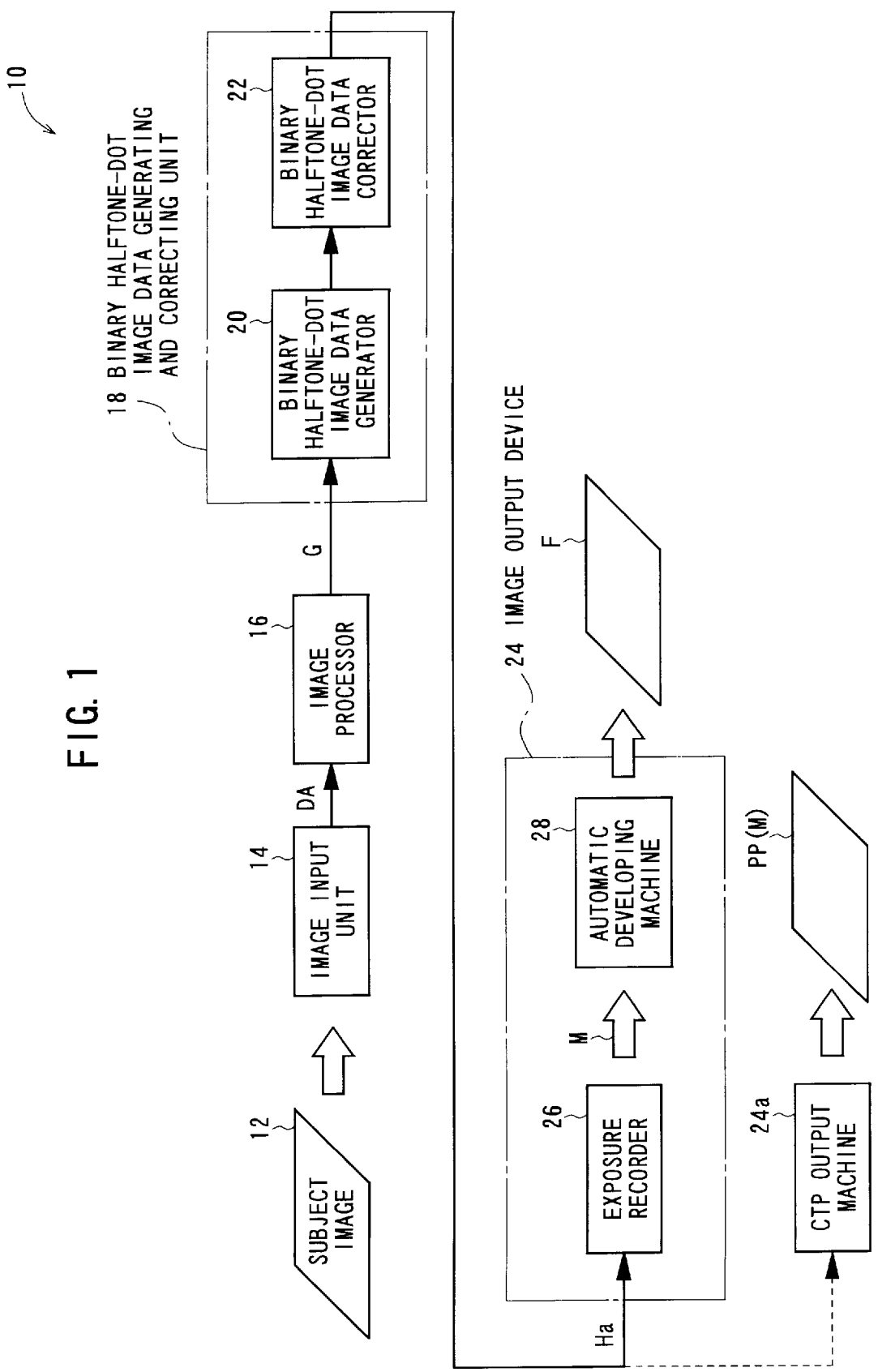
FIG. 1 is a block diagram of a platemaking system to which the principles of the present invention are applied.

FIG. 1 shows in block form a platemaking system according to an embodiment (first embodiment) of the present invention.

As shown in FIG. 1, the platemaking system, generally denoted by 10, basically comprises an image input unit 14, an image processor 16, a binary halftone-dot image data generating and correcting unit 18, and an image output device 24. The platemaking system 10 serves to form an image read from a subject image 12 as a halftone-dot image on a film F.

The image input unit 14 typically comprises a scanner. In the image input unit 14, light reflected from or transmitted through the subject image 12 which is fed in an auxiliary scanning direction while being irradiated with light from a light source is applied to a photoelectric transducer such as a linear image sensor or the like. The photoelectric transducer is electrically scanned in a main scanning direction to convert the light into an electric image signal (pixel signal). The image signal is then converted by an A/D (analog-to-digital) converter into 8-bit digital image data (referred to simply as "image data" or "continuous-tone image data") DA whose value ranges from 0 to 255.

The image input unit 14 is not limited to such a scanner, but may be an image recording disk (image recording medium) such as a DVD or the like, a communication network, a digital still camera, or any medium capable of outputting digital image data.

The image data DA outputted from the image input unit 14 is processed by the image processor 16 for color correction, sharpness processing, and resolution conversion for matching the output resolution of the image output device 24. The processed image data is outputted as image data G from by the image processor 16.

It is assumed that the output resolution of the image output device 24 is 72 scanning lines/mm, for example. Since the unit "scanning lines/mm" could be mixed up with the unit for the screen ruling, the output resolution of the image output device 24 will hereinafter be referred to as 72 dpm (dot/mm) where the dot means one pixel.

The binary halftone-dot image data generating and correcting unit 18 comprises a binary halftone-dot image data generator 20 and a binary halftone-dot image data corrector 22. The image data G outputted by the image processor 16 is supplied to the binary halftone-dot image data generator 20.

Figure 2:
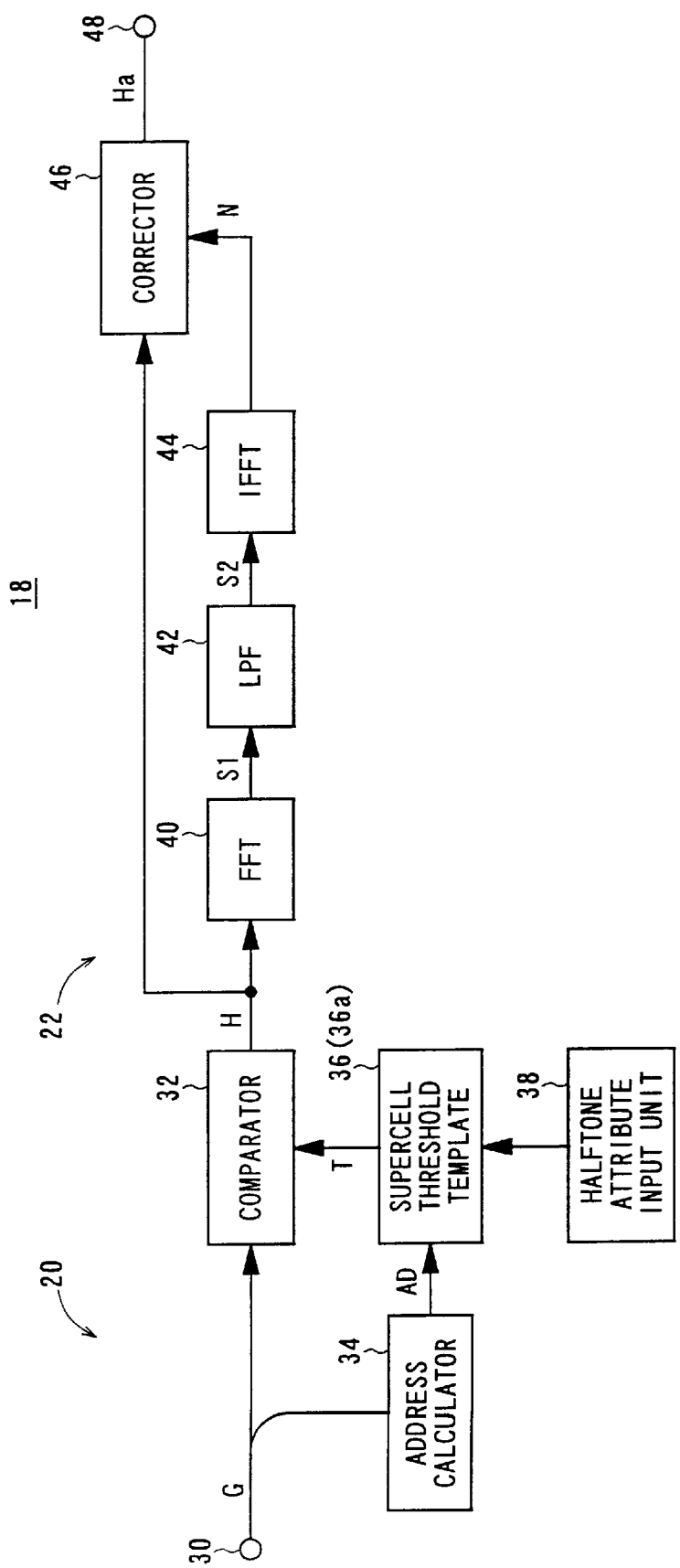
FIG. 2 is a block diagram showing details of a binary halftone-dot image data generating and correcting unit.

FIG. 2 shows the binary halftone-dot image data generating and correcting unit 18 in detail. The binary halftone-dot image data generating and correcting unit 18 may be either software-implemented, or hardware-implemented, or both software- and hardware-implemented.

The binary halftone-dot image data generator 20 comprises a fast Fourier transform (FFT) unit 40 as a frequency converting means, a low-pass filter (LPF) 42, an inverse fast Fourier transform (IFFT) unit 44 as an inverse frequency converting means, and a corrector 46. Another frequency converting means such as a wavelet converting means may be employed instead of the fast Fourier transform unit 40. If a wavelet converting means is employed, then an inverse wavelet converting means is used as the inverse frequency converting means instead of the inverse fast Fourier transform unit 44.

As shown in FIG. 2, the image data G supplied to the binary halftone-dot image data generator 20 is supplied through an input port 30 to a comparison input terminal of a comparator 32. The image data G is also supplied to an address calculator 34, which calculates an address AD=AD (x,y) representing x- and y-axis addresses on a supercell threshold template 36 from the image data G. The supercell threshold template 36 reads a threshold (8-bit threshold data whose value ranges from 0 to 255) T stored in the calculated address AD, and supplies the threshold T to a reference input terminal of the comparator 32.

The supercell threshold template 36 as threshold matrix data represents data corresponding to halftone attributes (screen ruling, screen angle, and dot shape) designated by a halftone attribute input unit 38. In this embodiment, the screen ruling is 175 lines per inch (LPI), the screen angle is 45°, and the dot shape is a square.

A supercell comprises a plurality of halftone-dot cells (halftone dots). Generally, in the art of generating halftone dots, a supercell is established on a pixel grid determined by the output resolution, and the established supercell is divided into halftone-dot cells. Thresholds are assigned to respective pixels in the halftone-dot cells to generate halftone-dot thresholds. A supercell to which thresholds is referred to as a "supercell threshold template".

A reference book regarding the art of generating halftone dots in relation to a supercell is titled "Postscript screening" written by Peter Fink and published on Aug. 11, 1994 by MDN Corporation, 1st edition, 1st printing.

With the introduction of a supercell which comprises a plurality of halftone-dot cells, it is possible to change the screen ruling and the screen angle in smaller pitches for thereby selecting values closer to the screen ruling and the screen angle that are designated.

The pixel grid is a cluster of pixels each serving as a unit to be blackened. The pixel grid can be visualized as an array of pixels arranged in vertical columns and horizontal rows at the output resolution.

In this embodiment, the supercell threshold template 36 comprises a supercell threshold template disclosed in Japanese laid-open patent publication No. 8-317218 (first process) or Japanese laid-open patent publication No. 9200518 (second process).

In FIG. 2, the comparator 32 compares the image data G and the threshold data (also referred to simply as "threshold") T and generates binary halftone-dot image data (also referred to as "binary data", "binary image data", "halftone-dot image data", "halftone-dot gradation data" or "digital halftone-dot data") H which may be either "1" or "0" ($G \geq T \rightarrow 1$ (ON, blackened), $G<T \rightarrow 0$ (OFF, blank or non-blackened)). The comparator 32 supplies the binary halftone-dot image data H to the fast Fourier transform unit 40 and an input terminal of the corrector 46.

The binary halftone-dot image data H comprises image data in a position space (real space). The image data in the position space is data in a coordinate system defined in on xy plane. The fast Fourier transform unit 40 converts the binary halftone-dot image data H in the position space into data S1 in a frequency space, which is then supplied to the low-pass filter 42 whose cutoff frequency is set to a fundamental frequency component (screen ruling component) of the halftone dots. The data in the frequency space is data in a coordinate system defined on a frequency plane with x-and y-axes being frequency axes.

The low-pass filter 42 extracts data S2 including low-frequency noise components whose frequencies are lower than the fundamental frequency component (screen ruling component) of the halftone dots, from the data S1 in the frequency space, and supplies the extracted data S2 to the inverse fast Fourier transform unit 44.

The inverse fast Fourier transform unit 44 converts the data S2 into image data (referred to as "noise image data") N in the position space, and supplies the image data N to another input terminal of the corrector 46.

The corrector 46 corrects the pixels in the binary halftone-dot image data H which positionally correspond to the pixels containing the noise components in the noise image data N, such that the noise components will be reduced, and supplies corrected binary halftone-dot image data Ha through a port 48 to an exposure recorder 26 (see FIG. 1) of the image output device 24. The correcting process carried out by the corrector 46 will be described in detail later on. The exposure recorder 26 scans a photosensitive material M with a laser beam (recording beam) that is modulated, i.e., turned on and off, depending on the corrected binary halftone-dot image data Ha for thereby forming a latent halftone-dot image on the photosensitive material M. The latent halftone-dot image on the photosensitive material M is then developed by an automatic developing machine 28 of the image output device 24, for thereby generating a film F with a visualized halftone-dot image thereon. A press plate is produced from the film F used as an original film, and then installed on a printing press. Then, ink is applied to the press plate and then transferred to a sheet of photographic paper, which is produced as a final printed material with the image printed thereon.

The principles of the present invention are applicable to not only the image output device 24 which outputs the film F as an original film, but also a CTP (computer to plate) output machine 24a which is an image output device capable of outputting a press plate PP directly from the corrected binary halftone-dot image data Ha. In the CTP output machine 24a, a photosensitive material M is scanned with a modulated laser beam (recording beam) to produce a press plate PP.

Operation of the binary halftone-dot image data corrector 22 will be described in greater detail below.

In this embodiment, it is assumed that the supercell threshold template 36 has a size of 119 pixels×119 pixels. Thus, a minimum unit of repeated halftone-dot threshold data is 119 pixels×119 pixels.

It is also assumed that the output resolution with respect to the image data G is 72 dots/mm (pixels/mm). A pixel has a size of 13.9 $\mu$m×13.9 $\mu$m (1 mm÷72).

As described above, the screen ruling is 175 lines/inch= 6.89 lines/mm, and the screen angle is 450. Therefore, a halftone dot has a size of 145 $\mu$m×145 $\mu$m (24.5 mm÷175).

A screen tint whose dot percent is 50% is considered to be a halftone-dot image represented by the image data G. The fundamental frequency of the halftone dots is substantially equal to the screen ruling, and may be 6.89 c/mm (cycles per mm).

Figure 3:
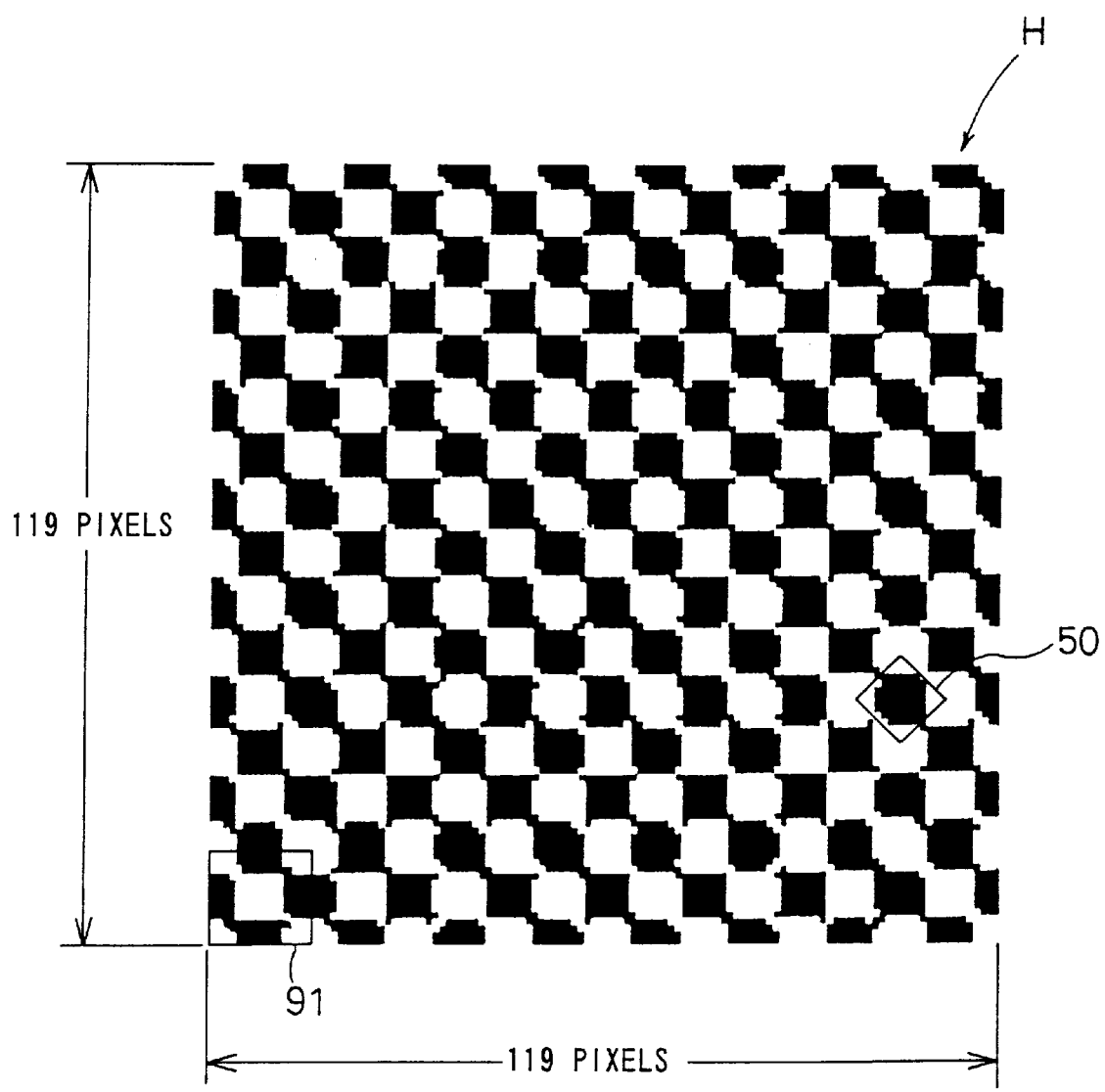
FIG. 3 is a diagram showing an image in a position space expressed by binary halftone-dot image data before being corrected.

FIG. 3 shows a halftone-dot image, which can be considered to be a bit pattern, based on the binary halftone-dot image data H of 119 pixels×119 pixels relative to a single supercell produced by the comparator 32 under the above assumption. In this embodiment, for an easier understanding, a halftone-dot image which would be formed on the film F and the final printed material if the binary halftone-dot image data H were not processed by the binary halftone-dot image data corrector 22 is the same as the halftone-dot image shown in FIG. 3. It can be understood from FIG. 3 that the binary halftone-dot image data H is equivalent to the data in the coordinate system defined on the xy plane, i.e., the data in the position space (which may be considered to be z-axis data), as it is of a value "0" (non-blackened) or "1" (blackened).

In FIG. 3, a halftone dot 50 illustrated by way of example contains about 109 ($145^2/13.9^2$) pixels.

The binary halftone-dot image data H is converted into the data S1 in the frequency space by the two-dimensional fast Fourier transform unit 40.

Figure 4:
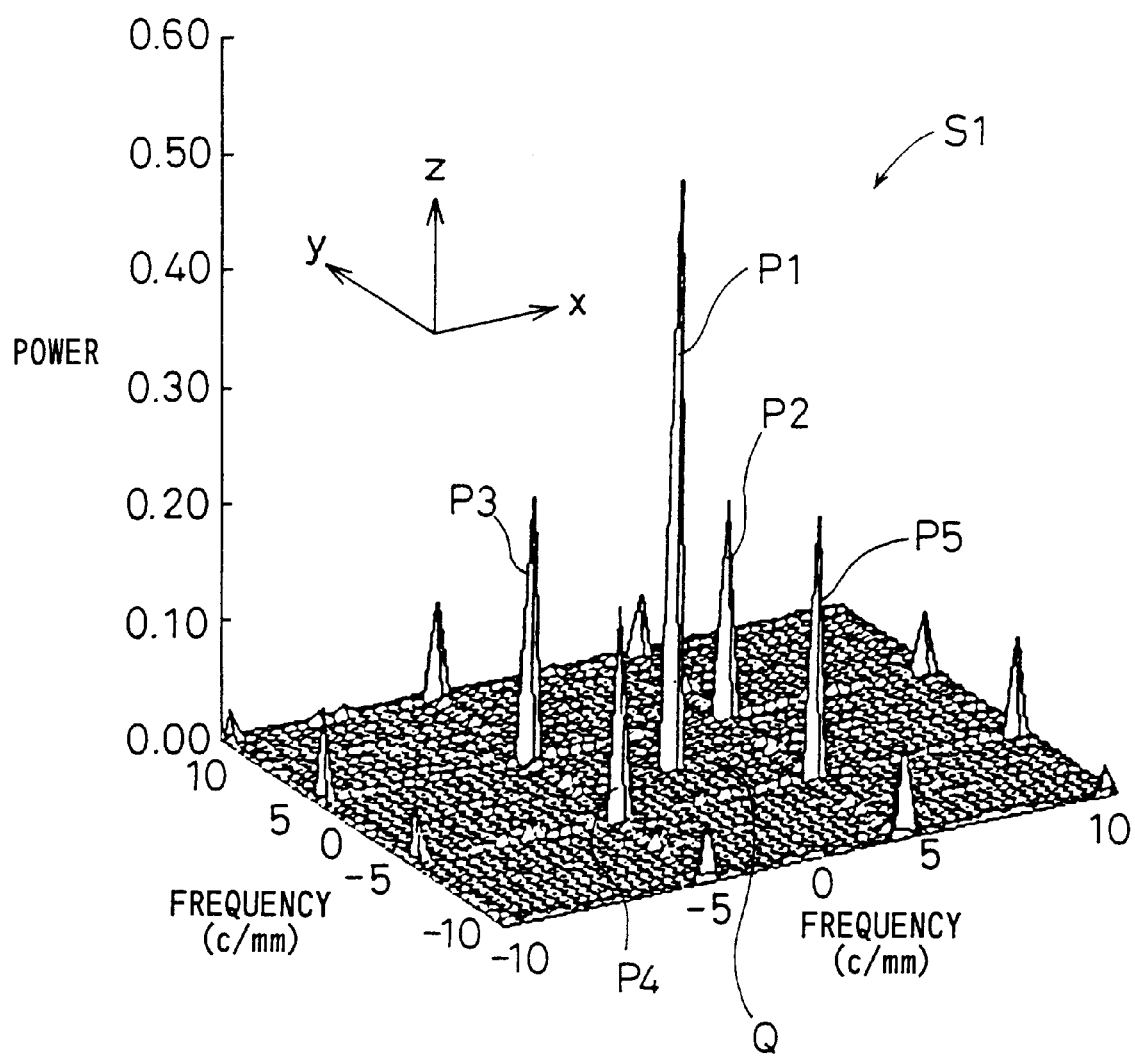
FIG. 4 is a diagram showing FFT powers produced when the binary halftone-dot image data before being corrected, shown in FIG. 3, is subjected to a fast Fourier transform.

FIG. 4 shows FFT powers of the data S1 in the frequency space as converted by the fast Fourier transform unit 40, which corresponds to the binary halftone-dot image data H in the position space shown in FIG. 3. In FIG. 4, the x-axis and the y-axis represent frequencies (c/mm), and the z-axis represents the power which is standardized such that all power values amount to "1".

In the data S1 in the frequency space shown in FIG. 4, a power P1 having a value of about 0.5 at central coordinates (x, y)=(0, 0) is a basic component corresponding to 50% which is the dot percent of the screen tint, and does not represent noise. Powers P2 through P5 whose values are about 0.2 and which are positioned at coordinates near coordinates (x, y)=(5, 5), (−5, 5), (−5, −5), (5, −5) that are angularly spaced at 45° around the central coordinates (x, y)=(0, 0) are also components corresponding to the fundamental frequency of 6.89 c/mm of the halftone dots, and do not represent noise. The exact x, y coordinates where the power P2 is present, for example, are not (5, 5), but can be calculated as 6.89÷$\sqrt{2}$=4.87.

Figure 5:
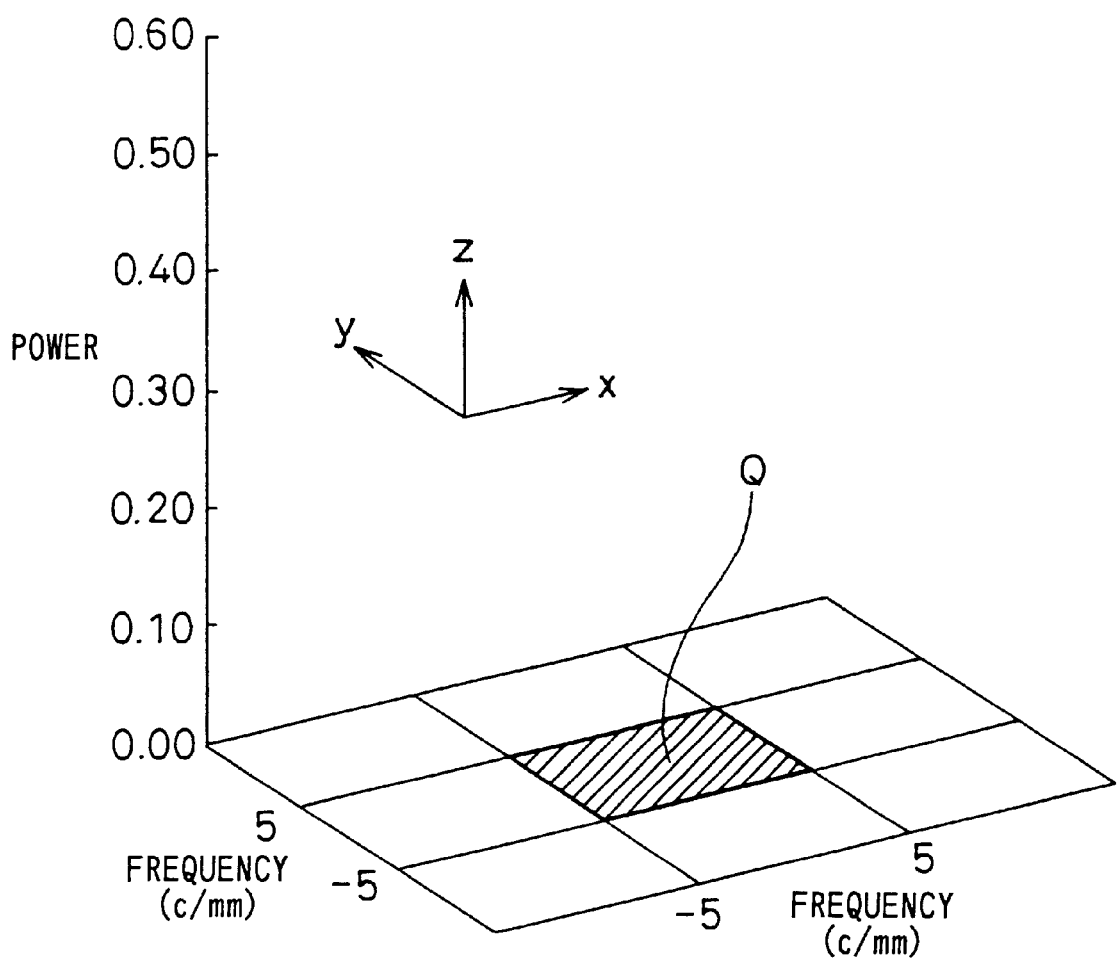
FIG. 5 is a diagram illustrative of the region of low-frequency components to be extracted.

It can be seen that in view of the fact that a moire pattern is an interference pattern generated at a frequency equal to or lower than the frequency of the halftone dot, frequency components existing in a region Q (also see a hatched region in FIG. 5) surrounded by the four points of the coordinates (x, y)=(5, 5), (−5, 5), (−5, −5), (5, −5) are noise components related to a moire pattern.

Figure 6:
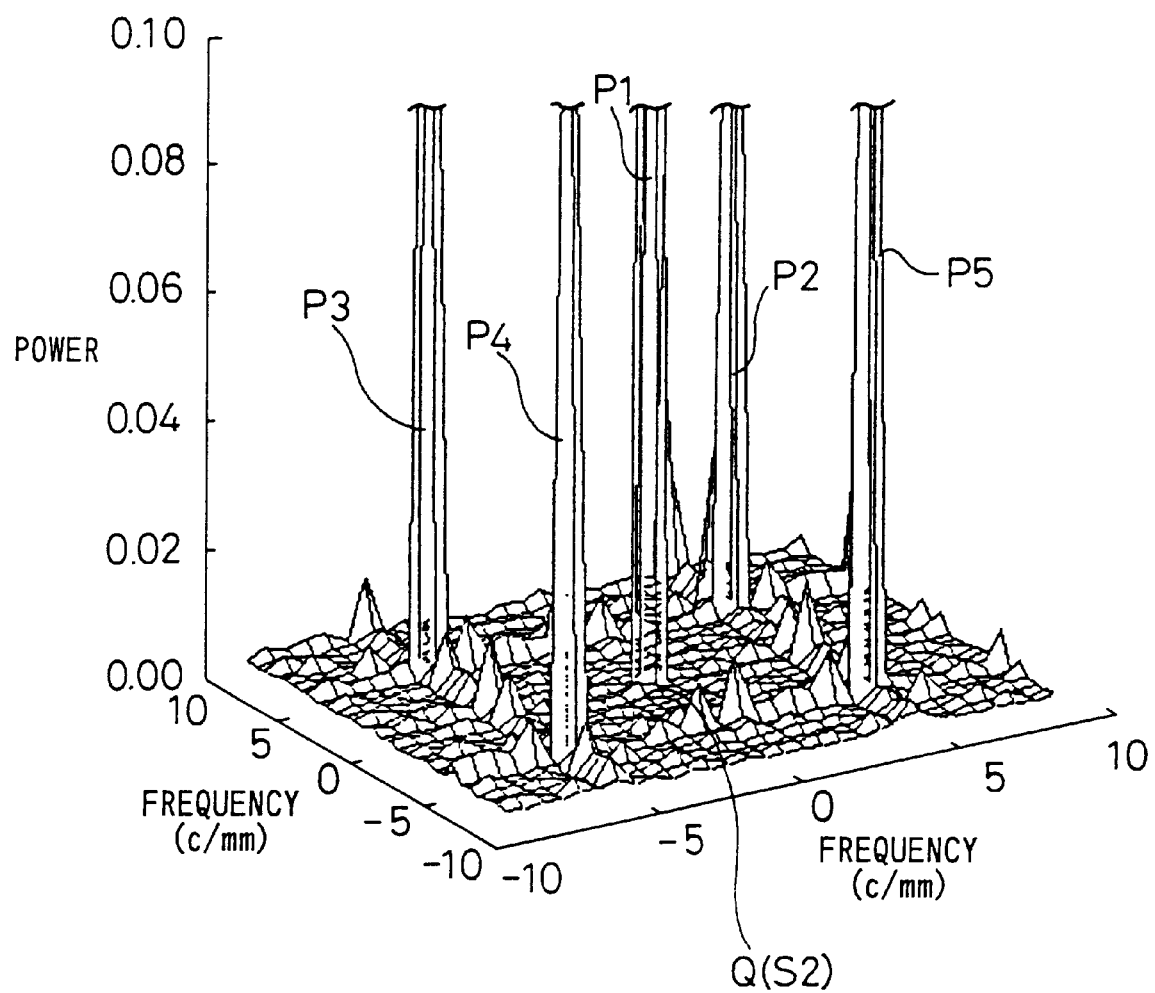
FIG. 6 is a diagram showing FFT powers of the region, shown at an enlarged scale, of the low-frequency components to be extracted.

FIG. 6 shows FFT powers of an area including the region Q, shown at an enlarged scale. A study of FIG. 6 indicates that there are small power irregularities, i.e., power components, in the region Q.

In order to remove high-frequency components from outside of the region Q, the low-pass filter 42 which has the cutoff frequency corresponding to the region Q is applied to extract data including low-frequency components in the region Q. Stated otherwise, the data S2 including the low-frequency noise components whose frequencies are lower than the fundamental frequency component of the halftone dots is extracted from the data S1 in the frequency space. At this time, the power P1 which is a direct-current component is also removed. Since such a direct-current component is rejected, the low-pass filter 42 is accurately termed as a bandpass filter. However, it is called a low-pass filter because it passes data containing low-frequency noise components.

Then, the inverse fast Fourier transform unit 44 converts the data S2 including the low-frequency noise components extracted by the low-pass filter 42 into data in the position space (real space), i.e., the noise image data N.

Figure 7:
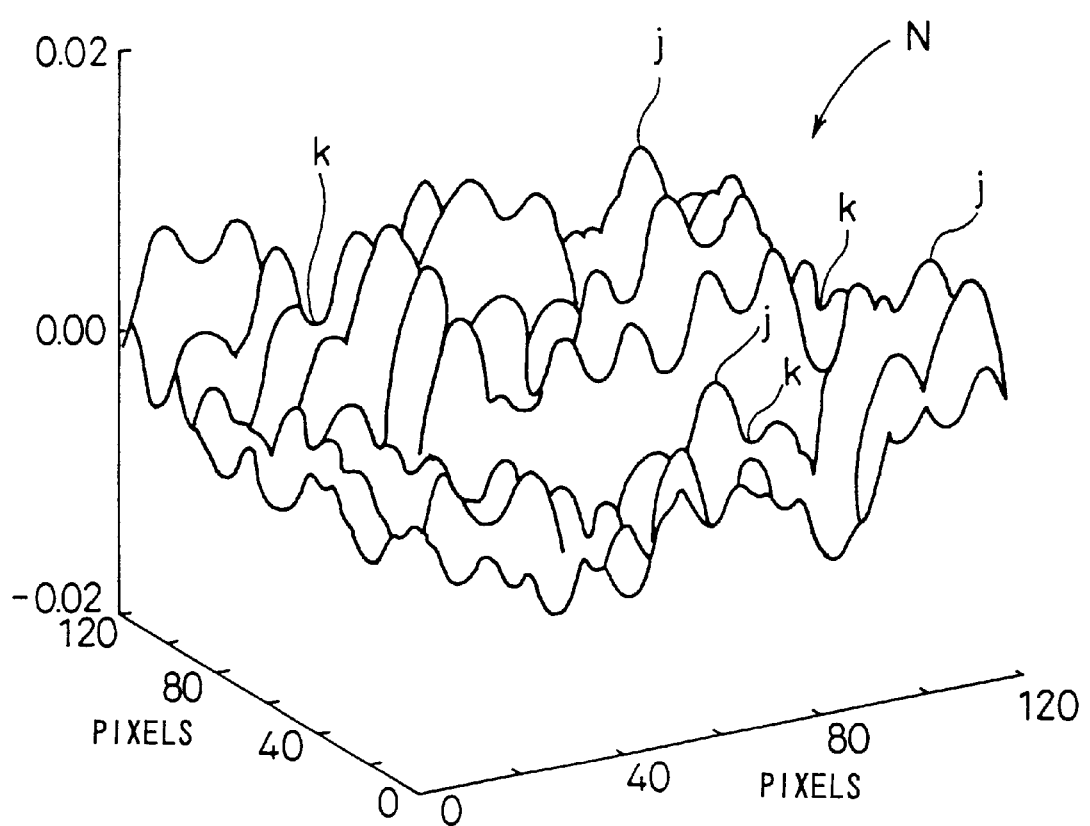
FIG. 7 is a diagram showing the low-frequency components in a position space as the extracted low-frequency components are subjected to an inverse Fourier transform.

FIG. 7 shows three-dimensionally shows the noise image data N in the region of 119 pixels×119 pixels in the position space. It can be seen from FIG. 7 that low-frequency variations of the density in the original image are expressed as peaks and valleys on a three-dimensional figure.

The corrector 46 corrects the pixels of the binary halftone-dot image data H (see FIG. 3) which correspond to the pixels the pixels including the noise components in the noise image data N, such that the noise components will be reduced.

Specifically, peaks of the noise image data N, i.e., crests j of mountains that are maximum peaks of the density and bottoms k of valleys that are minimum peaks of the density, are considered to be pixels containing noise components. If pixel data in the binary halftone-dot image data H which corresponds to the pixel position of a crest j, i.e., which is in the same coordinate position as the pixel position, is "1" (blackened), then the pixel data is inverted into "0" (non-blackened). If pixel data in the binary halftone-dot image data H which corresponds to the pixel position of a bottom k, i.e., which is in the same coordinate position as the pixel position, is "0" (non-blackened), then the pixel data is inverted into "1" (blackened). In this manner, the binary halftone-dot image data H is corrected into binary halftone-dot image data Ha. At this time, the binary halftone-dot image data H is corrected such that there will be no blackened pixel isolated from the blackened area of the halftone dot 50.

For accurate removal of the low-frequency noise components, it is necessary to repeat the process ranging from the frequency conversion with the fast Fourier transform unit 40 to the pixel replacement with the corrector 46. This is because the positions of the mountains and valleys of the low-frequency components, i.e., the mountains and valleys of the density, change each time one pixel is replaced. Therefore, each time a process of replacing a pair of pixels (if the pixel data in the binary halftone-dot image data H which corresponds to the pixel position of the crest j of a mountain is "1", then the pixel data is inverted into "0", and if the pixel data in the binary halftone-dot image data H which corresponds to the pixel position of the bottom k of a valley is "0", then the pixel data is inverted into "1") is carried out, it is necessary that the replaced binary halftone-dot image data H be Fourier-transformed by the fast Fourier transform unit 40, and the low-frequency components be extracted by the low-pass filter 42, and the extracted data be inversely Fourier-transformed by the inverse fast Fourier transform unit 44. Each pair of pixels is replaced in order to prevent the density of the entire supercell from changing, i.e., to reserve the density even after the binary halftone-dot image data H is corrected.

Figure 8:
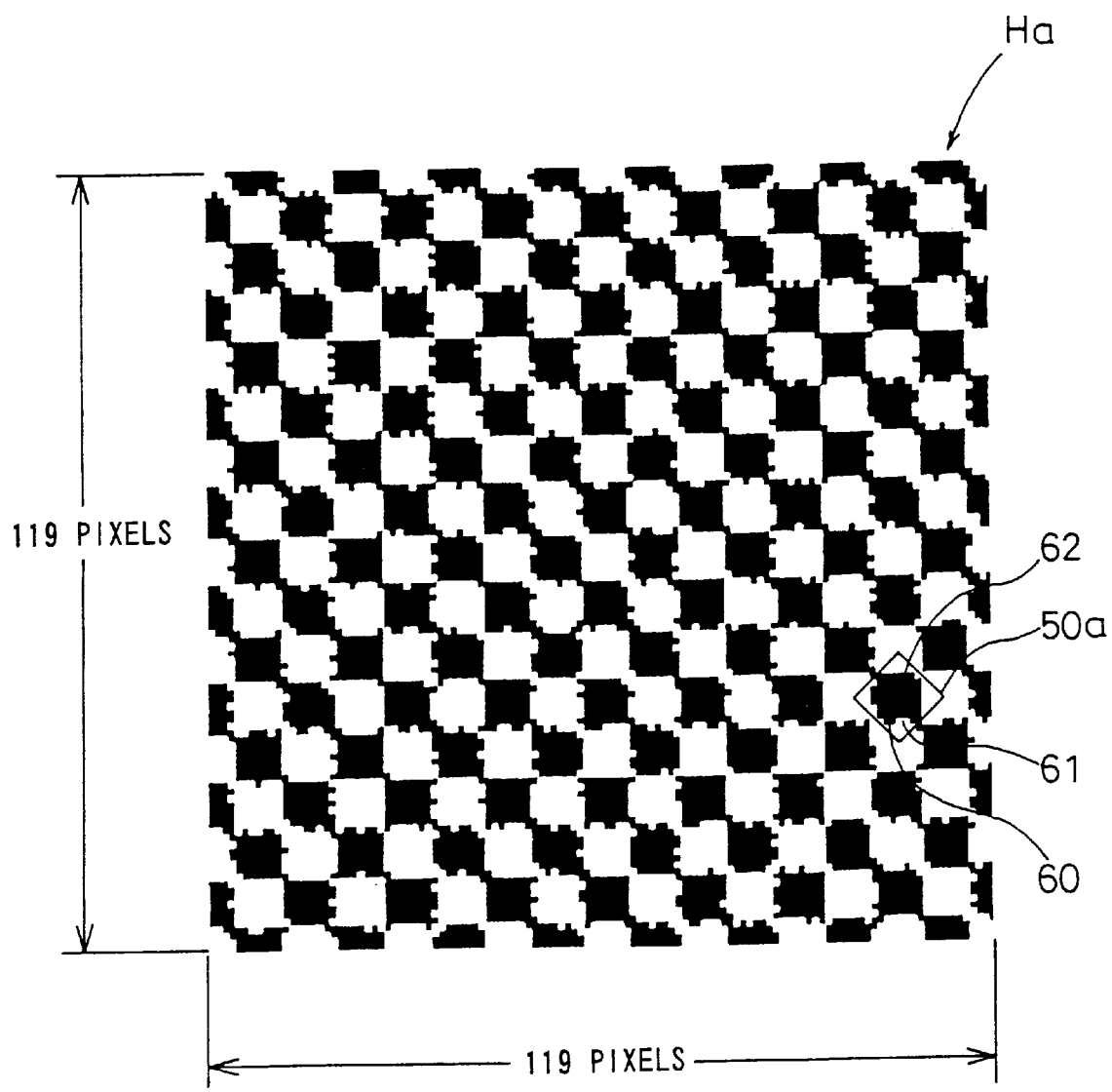
FIG. 8 is a diagram showing an image in a position space expressed by binary halftone-dot image data after being corrected.

FIG. 8 shows a bit pattern of the corrected binary halftone-dot image data Ha thus generated. It can be seen from FIG. 8 that the halftone dot 50 given as an example in FIG. 3 has been corrected and changed into a halftone dot 50a with a newly blackened pixel 60 and a newly non-blackened pixel 61.

Any moire pattern cannot essentially recognized in a halftone-dot image on the film F which has been exposed and developed by the image output device 24 based on the corrected binary halftone-dot image data Ha.

Figure 9:
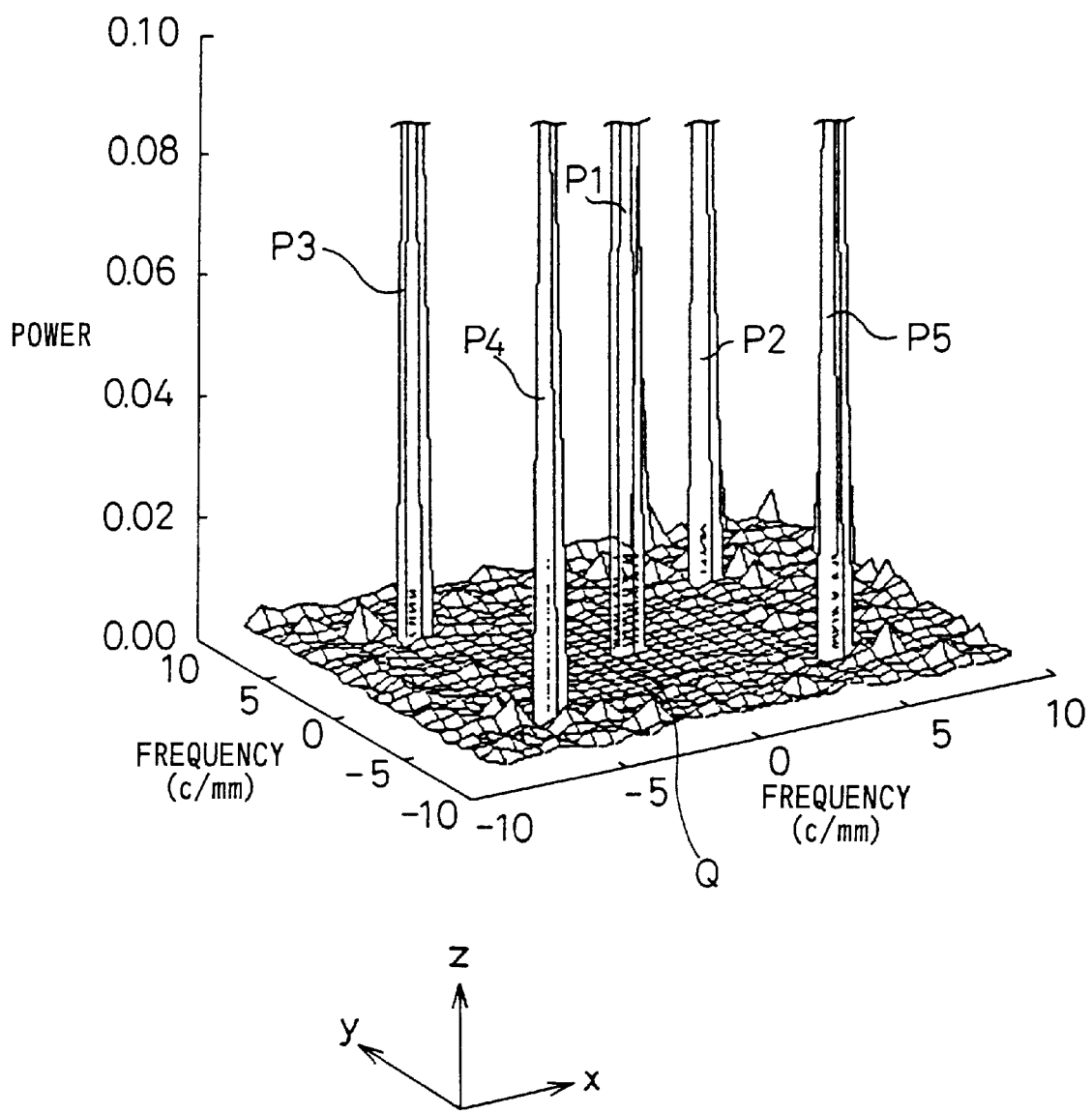
FIG. 9 is a diagram showing FFT powers of a region in the vicinity of the low-frequency components, produced when the binary halftone-dot image data after being corrected is subjected to a fast Fourier transform.

FIG. 9 shows FFT powers near the region Q whose frequencies are lower than the fundamental frequencies of the halftone dots, produced when the binary halftone-dot image data Ha corrected by pixel replacement is Fourier-transformed by the fast Fourier transform unit 40. FIG. 10 shows a three-dimensional pattern of noise image data Na representing data which has been passed through the low-pass filter 42 and inversely Fourier-transformed into the position space (real space). It can be understood from FIG. 9 that any powers of noise components are almost entirely removed from the region Q and from FIG. 10 that the undulation (amplitude) of the noise image data Na is reduced.

In this embodiment, when high-frequency components outside of the region Q in the data S1 produced by fast-Fourier-transforming the binary halftone-dot image data H with the fast Fourier transform unit 40 are removed by the low-pass filter 42, they are weighted by human vision characteristics 65 shown in FIG. 11 and extracted. Consequently, as shown in FIG. 7, the noise image data N inversely Fourier-transformed by the inverse fast Fourier transform unit 44, i.e., the low-frequency components, are weighted for easy visual recognition.

As shown in FIG. 11, the human vision characteristics 65 have a maximum sensitivity level in the vicinity of the frequency of 0.8 c/mm.

In the above embodiment, the present invention is applied to the binary halftone-dot image data H. However, the principles of the present invention are also applicable to multivalued halftone-dot image data having four values, eight values, etc.

Prior to describing another embodiment (second embodiment) of the present invention, a basic algorithm BALG for generating corrected halftone-dot image data Ha capable of reducing a moire pattern in the first embodiment (also applicable to the second embodiment) will be described below with reference to a flowchart shown in FIG. 12. The processing sequence based on the flowchart shown in FIG. 12 can be executed by a computer according to a program. For an easier understanding, those data shown in FIG. 12 which are identical to those shown in FIGS. 1 through 11 are denoted by identical reference characters.

According to the basic algorithm BALG, multivalued (binary, four-valued, eight-valued, etc.) halftone-dot image data H in the position space is converted into data S1 in the frequency space in step R1. Thereafter, data S2 containing low-frequency noise components whose frequencies are lower than the fundamental frequency components of the halftone dots is extracted from the data S1 in step R2. The extracted data S2 containing low-frequency noise components in the frequency space is inversely converted into image data N in the position space in step R3. The image data N in the position space is then corrected by comparing the pixels including the noise components in the image data N with corresponding pixels in the halftone-dot image data H in step R4, thereby producing corrected halftone-dot image data Ha.

An algorithm TALG for generating halftone-dot threshold data according to the other embodiment (second embodiment) will be described below with reference to a flowchart shown in FIG. 13. The processing sequence based on the flowchart shown in FIG. 13 can be executed by a computer according to a program. For an easier understanding, those data shown in FIG. 13 which are identical to those shown in FIGS. 1 through 12 are denoted by identical reference characters and will not be described in detail below.

First, the other embodiment (second embodiment) will be described below. According to the other embodiment (second embodiment), the array of threshold values (their position) of the supercell threshold template 36 (halftone-dot threshold data) used to generate the binary halftone-dot image data H in the comparator 32 of the binary halftone-dot image data generator 20 (see FIG. 2) is replaced and changed according to certain processing steps for thereby generating a corrected supercell threshold template 36a which is capable of reducing a moire pattern on an outputted film F.

Figure 13:
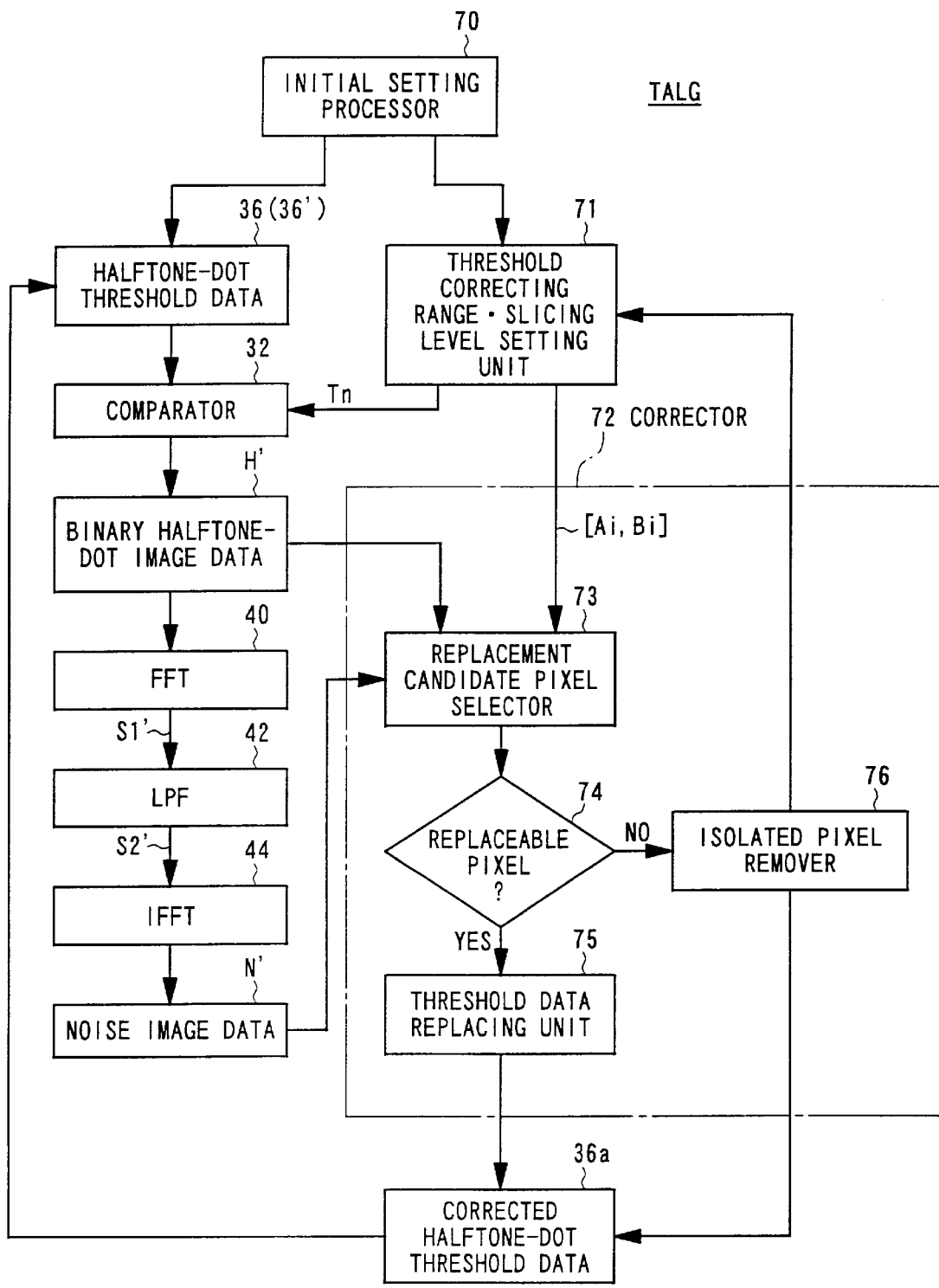
FIG. 13 is a flowchart of another algorithm according to the present invention.

First, as shown in FIG. 13, an initial setting processor 70 carries out an initializing process to generate a supercell threshold template 36 (halftone-dot threshold data) to be corrected and determine a threshold correcting range which will be described later on.

The supercell threshold template 36 may be generated in view of the screen ruling, the screen angle, and the dot shape, but may be an existing supercell threshold template. An existing supercell threshold template 36 may be the one disclosed in Japanese laid-open patent publication No. 8-317212 (first process) or Japanese laid-open patent publication No. 9-200518 (second process).

Figure 14:
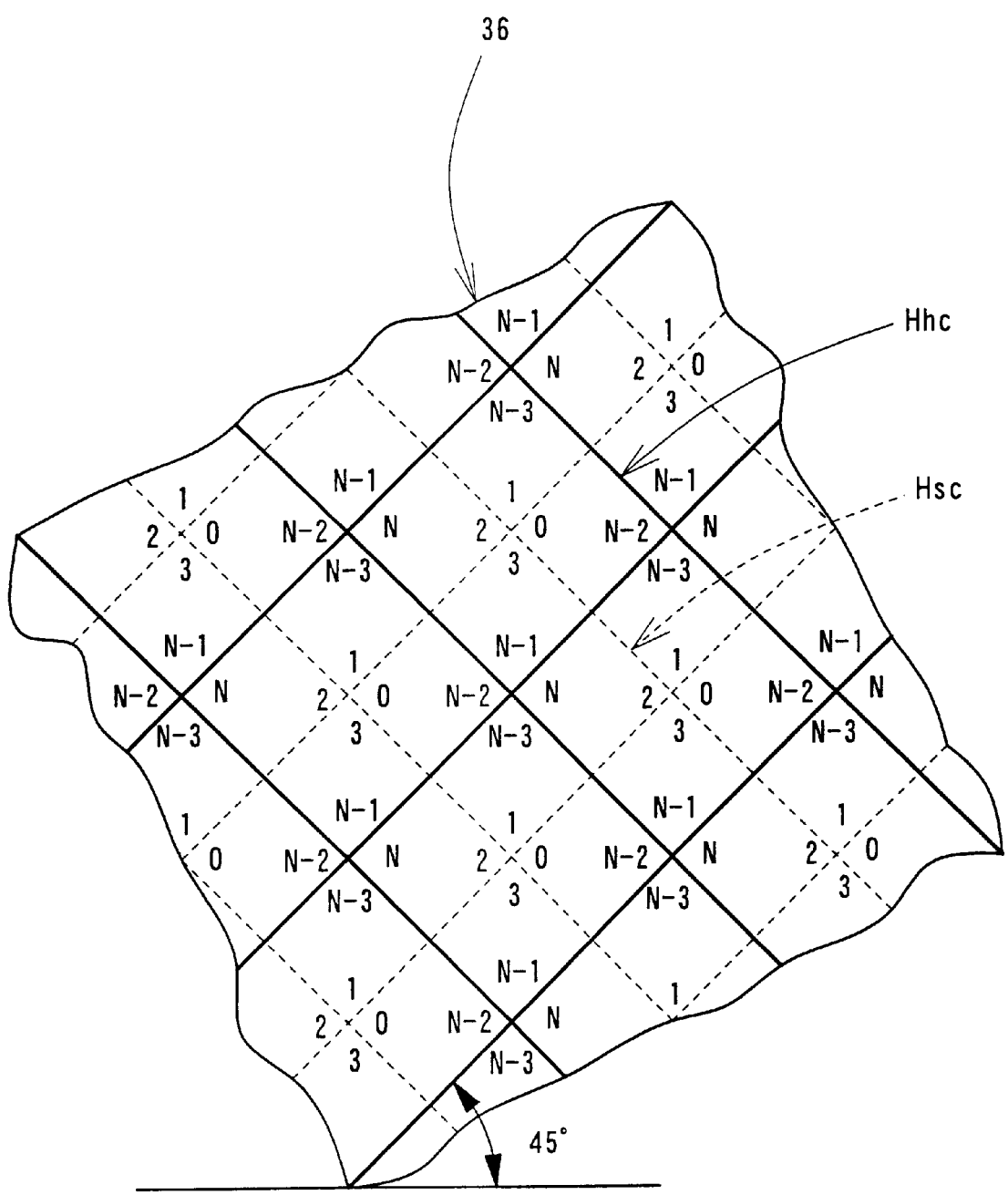
FIG. 14 is a diagram showing an example of halftone-dot threshold data.

The array of threshold values according to the first process will be described below. When a supercell is to be divided into halftone-dot cells and threshold values T=0, 1, 2, 3, ..., N−3, N−2, N−1, N are to be assigned to the pixels, the supercell is divided into halftone dots Hhc around highlight spots (halftone dots where blackening starts from the center) and halftone dots Hsc around shadow spots (halftone dots where non-blackening starts from the center), the halftone dots Hhc and the halftone dots Hsc overlapping each other, as partly shown in FIG. 14.

The halftone dots Hhc and the halftone dots Hsc overlap each other because the vertexes of the halftone dots Hhc represented by the solid-line squares are aligned with the centers of the halftone dots Hsc represented by the dotted-line squares. Threshold values T=0, 1, 2, 3, ... successively assigned to the pixels in the halftone dots Hhc and threshold values T=N, N−1, N−2, N−3, ... successively assigned to the pixels in the halftone dots Hsc are alternately determined.

Specifically, a threshold value T=0 is assigned to a pixel near the center of each of the halftone dots Hhc, and then a threshold value T=N is assigned to a pixel near the center of each of the halftone dots Hsc. Thereafter, threshold values T=1, T=N−1, T=2, T=N−2, T=3, T=N−3 are successively assigned in the order named to the pixels around the central pixels. In this manner, a supercell threshold template 36 (halftone-dot threshold data) is produced.

Figure 15:
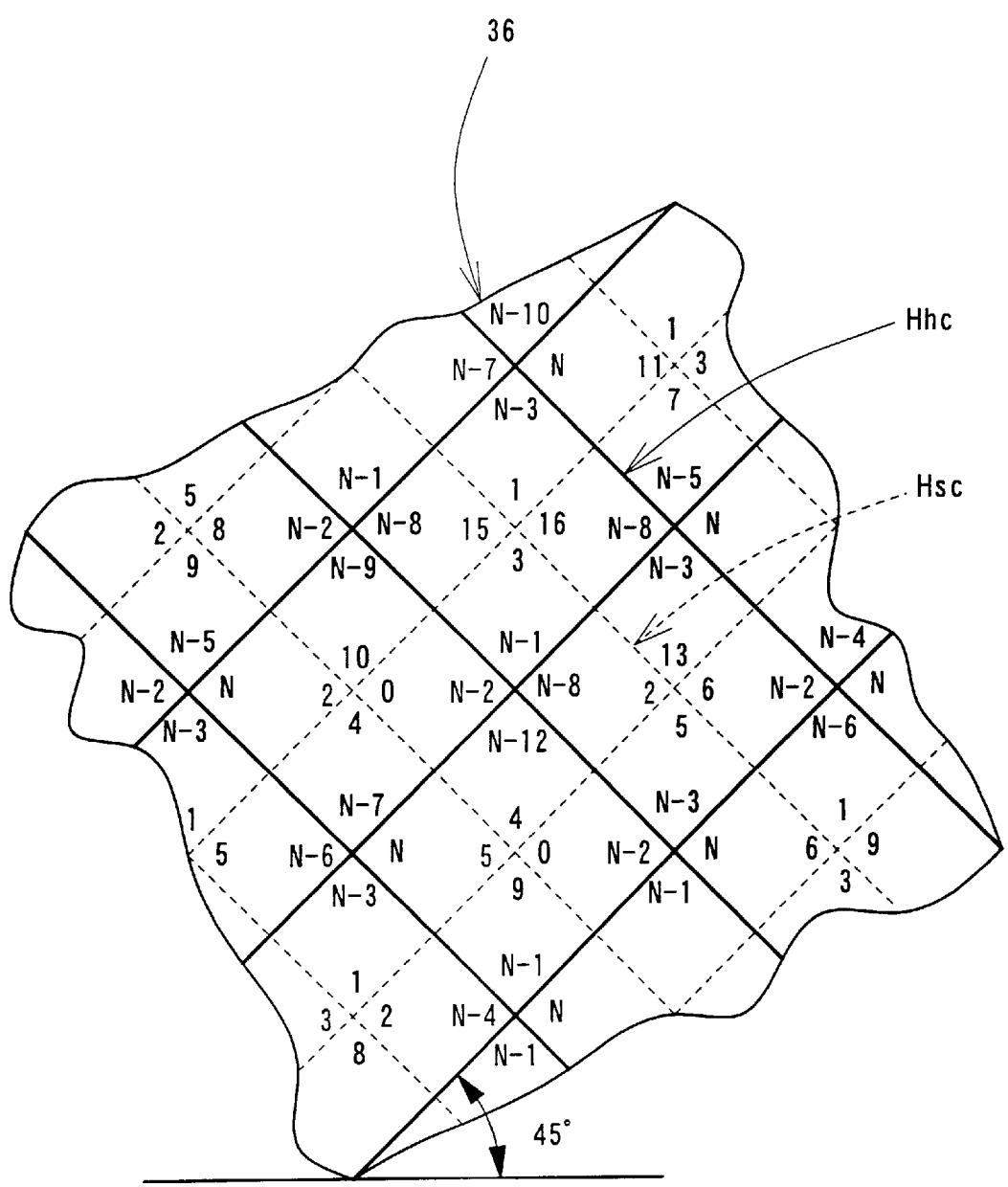
FIG. 15 is a diagram showing another example of halftone-dot threshold data.

According to the second process, random numbers which are different for respective halftone dots are added to the coordinates of the pixels to which the threshold values are assigned according to the first process, for thereby determining a blackening sequence. In this manner, halftone-dot threshold data 36 is produced as partly shown in FIG. 15.

The halftone-dot threshold data 36 thus produced is supplied to the comparison input terminal of the comparator 32 as shown in FIG. 13.

A numerical range for the thresholds T of the halftone-dot threshold data 36 generated by the initial setting processor 70, i.e., a threshold correcting range for correcting the position of the thresholds, to be selected from 0, 1, ..., 255, for example, is set in a threshold correcting range-slicing level setting unit 71. If a film F corresponding to the supercell threshold template 36 to be corrected is outputted by the image output device 24 for each threshold value and a threshold correcting range is determined insofar as a moire pattern is conspicuous, then the subsequent process can efficiently be carried out. A film F for each threshold value is a film F where if the threshold values T=122, for example, then the pixels to which the threshold values T=0, 1, 2, ..., 122 are assigned are blackened, and the pixels to which the threshold values T=123, 124, ..., 255 are assigned are not blackened (non-blackened). When a moire pattern is visually recognized on a film F outputted for each threshold value, threshold values near the visually recognized moire pattern are determined as a threshold correcting range.

It is assumed that the threshold correcting range thus determined has values A0 through B0. Initial values of the threshold correcting range having the values A0 through B0 are referred to as a "threshold correcting range [A0, B0]". Generally, a threshold correcting range is referred to as a "threshold correcting range [Ai, Bi]".

Figure 16A:
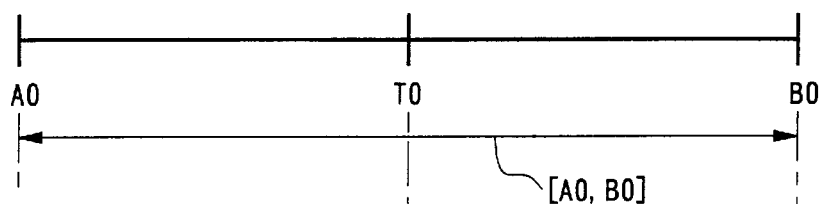
FIGS. 16A, 16B, and 16C are diagrams each illustrative of the setting of a threshold correcting range and a slicing level.

When the threshold correcting range [A0, B0] is set in the threshold correcting range-slicing level setting unit 71, the threshold correcting range-slicing level setting unit 71 calculates a slicing level Th as Th=(A0+B0)/2=T0 which is the central value of the threshold correcting range [A0, B0] (see FIG. 16A). The calculated slicing level Th is supplied to the reference input terminal of the comparator 32 as shown in FIG. 13.

The comparator 32 compares the halftone-dot threshold data 36 with the slicing level Th for thereby converting the halftone-dot threshold data 36 into binary halftone-dot image data H'.

Figure 12:
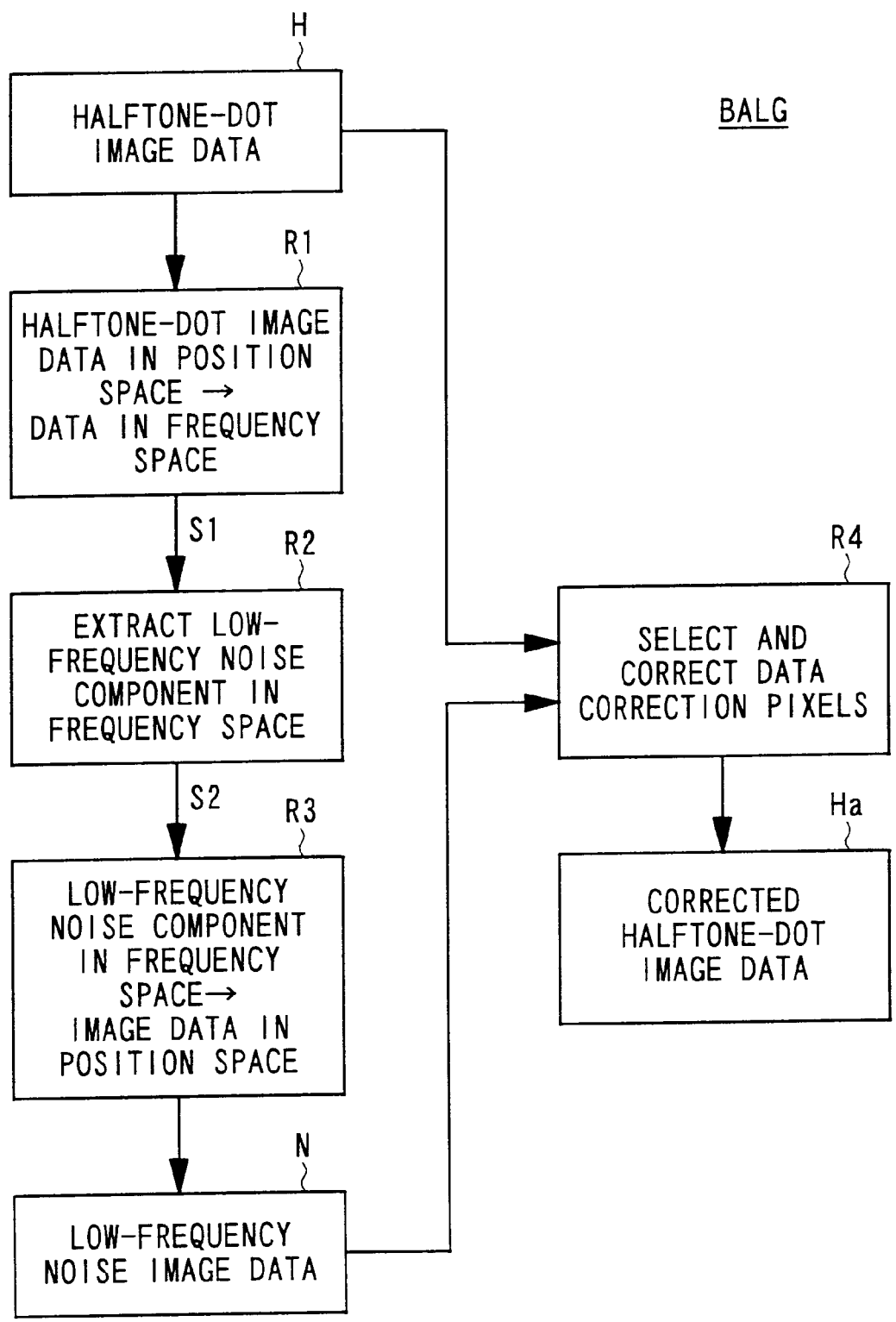
FIG. 12 is a flowchart of a basic algorithm according to the present invention.

As with the operation of the binary halftone-dot image data corrector 22, the binary halftone-dot image data H' is Fourier-transformed by the fast Fourier transform unit 40 into data S1' in the frequency space according to the basic algorithm BALG shown in FIG. 12. In this fashion, an FFT power diagram, as shown in FIG. 4, of the Fourier-transformed data S1' in the frequency space is produced.

In order to remove high-frequency components outside of the region Q (see FIGS. 4 and 5) in the manner described above, the low-pass filter 42 which has the cutoff frequency corresponding to the region Q is applied to extract data S2' including low-frequency components in the region Q. Stated otherwise, the data S2' including the low-frequency noise components whose frequencies are lower than the fundamental frequency component of the halftone dots is extracted from the data S1' in the frequency space. At this time, it is preferable to weight the data S1' in the frequency space according to the human vision characteristics 65 shown in FIG. 11.

Then, the inverse fast Fourier transform unit 44 inversely Fourier-transforms the data S2' including the low-frequency noise components into data in the position space (real space), i.e., noise image data N', as shown in FIG. 7.

Thereafter, a corrector 72 selects a pair of pixels (pixel positions) where threshold values are to be replaced in the halftone-dot threshold data 36, and replaces the halftone-dot threshold values corresponding to the pixel positions, thus generating corrected halftone-dot threshold data 36a where the array of threshold values is corrected. A pair of pixels refers to a combination of a pixel where a non-blackened pixel (which will be referred to as a "white pixel" for an intuitive understanding) is replaced with a blackened pixel (which will be referred to as a "black pixel" for the same reason), and a pixel where a black pixel is replaced with a white pixel.

Selective conditions for a replacement candidate pixel selector 73 to replace a white black with a black pixel will be described below. Selective conditions to replace a black pixel with a white pixel can be understood by replacing the term "white pixel" with the term "black pixel" in the selective conditions described below.

First, a replacement candidate pixel is a white pixel. According to this condition, a white pixel is selected in the binary halftone-dot image data H'.

Second, the magnitude of the threshold value T in the position of the replacement candidate pixel is of a value within the threshold correcting range [A0, B0]. According to this condition, there is selected a pixel having the threshold value T within the threshold correcting range [A0, B0], among threshold values T of halftone-dot threshold data 36' in a position corresponding to the white pixel selected from the binary halftone-dot image data H'.

Third, a replacement candidate pixel is a white pixel which will not drastically change the dot shape after replacement. This condition includes avoidance of an isolated pixel, i.e., a black pixel which has replaced a white pixel and is surrounded by white pixels adjoining four sides thereof.

Figure 17:
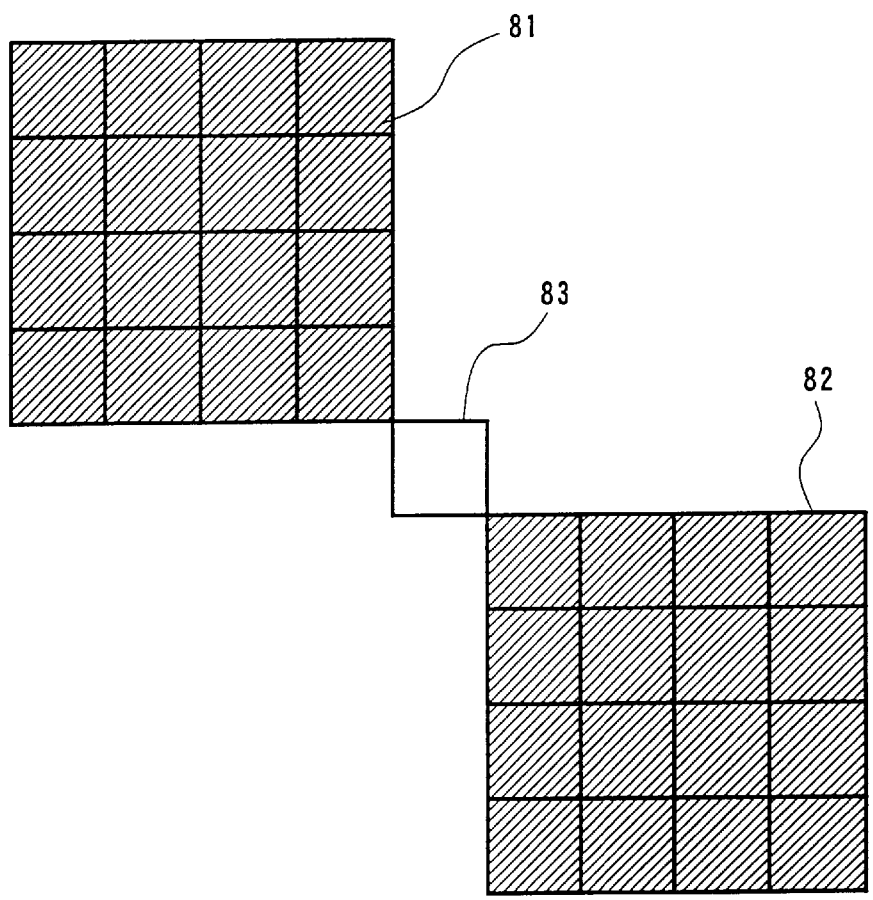
FIG. 17 is a diagram illustrative of an isolated pixel.
Figure 18:
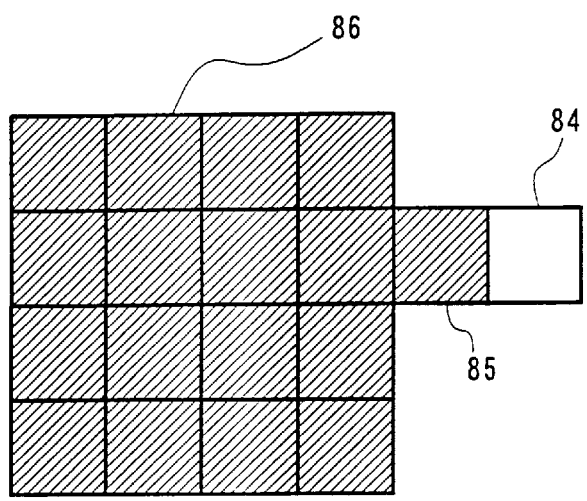
FIG. 18 is a diagram illustrative of an isolated pixel.

Specifically, as shown in FIG. 17, a white pixel 83 having vertexes adjoining blackened pixel groups 81, 82 is regarded as an isolated pixel. As shown in FIG. 18, a white pixel 84 adjoins a black pixel 85 at one side thereof, and the black pixel 85 adjoins another black pixel at one side thereof. The white pixel 84 is not selected as a replacement candidate pixel because it would drastically change the dot shape. If the black pixel 85 adjoins two or more black pixels, then the white pixel 84 is selected as a replacement candidate pixel. In FIG. 18, since the black pixel 85 adjoins only one black pixel 86, the white pixel 84 is not selected as a replacement candidate pixel.

One of white pixels that satisfy all the above selective conditions whose value in the noise image data N' is minimum, i.e., whose low-frequency noise components are minimum (the density is lowest), is selected as a first candidate as a white pixel that can be replaced with a black pixel.

As described above, selective conditions to replace a black pixel with a white pixel can be understood by replacing the term "white pixel" with the term "black pixel" in the above first through third selective conditions. A first candidate as a black pixel that can be replaced with a white pixel is one of black pixels that satisfy all the first and third selective conditions for replacing a black pixel with a white pixel, whose value in the noise image data N' is maximum, i.e., whose low-frequency noise components are maximum (the density is highest).

Then, if there is a pair of replaceable white and black pixels as decided by a replaceable pixel decision unit 74, then a threshold data replacement unit 75 uses the replaceable white and black pixels as replacement pixels, and corrects the array of threshold values in the halftone-dot threshold data 36 which correspond to the positions of the replacement pixels. Specifically, the threshold data replacement unit 75 selects a corresponding pair of threshold values in the halftone-dot threshold data 36 and replaces them, generating corrected halftone-dot threshold data 36a where the array of threshold values is corrected.

Then, the corrected halftone-dot threshold data 36a is used as halftone-dot threshold data 36', and the process of the comparator 32 for converting the halftone-dot threshold data 36' with the slicing level Th into binary halftone-dot image data H', the process of extracting noise image data N', the selecting process of the replacement candidate pixel selector 73, and the replacing process of the threshold data replacement unit 75 are repeated to correct the array of threshold values in the halftone-dot threshold data 36' until replacement pixels are no longer present, thus producing corrected halftone-dot threshold data 36a.

Since isolated pixels may possibly be generated when the corrected halftone-dot threshold data 36a is produced, when replaceable pixels at the same slicing level Th=A0 are eliminated, isolated pixels are removed from the corrected halftone-dot threshold data 36a by an isolated pixel remover 76. In this embodiment, an isolated pixel can be corrected by replacing any of eight pixels near the isolated pixel (on the assumption that pixels which will not become an isolated pixel are present in the eight pixels) with a threshold value.

After the process of removing isolated pixels has been carried out by the isolated pixel remover 76, a threshold correcting range [Ai, Bi] and a slicing level Th are reset in the threshold correcting range-slicing level setting unit 71.

Generally, halftone-dot threshold data is considered to be an accumulation of bit patterns of various densities. When the array of threshold data is replaced and corrected at a certain slicing level, the correcting effect at the slicing level is considered to affect nearby slicing levels. Therefore, it is not necessary to correct the array of threshold values for each slicing level. Actually, it is sufficient for the array of threshold values to be corrected for every 3 through 5 slicing levels. A threshold correcting range [Ai, Bi] and a slicing level Th need to be set in a manner not to affect previously corrected bit patterns and also to increase the freedom for pixel correction, i.e., the threshold correcting range.

Figure 16B:
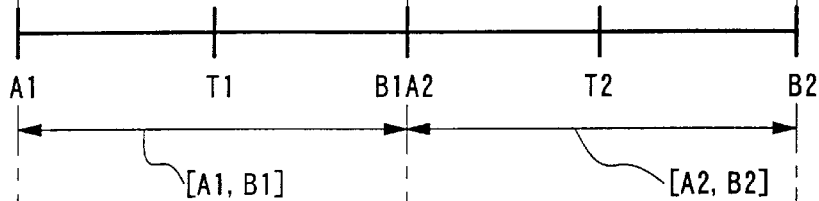

According to this embodiment, when a threshold correcting range [Ai, Bi] and a slicing level Th are initially set respectively to the threshold correcting range [Ai, Bi]=[A0, B0] and the slicing level Th=(A0+B0)/2=T0 as shown in FIG. 16A, a threshold correcting range [Ai, Bi] and a slicing level Th that are to be set next are set respectively to a threshold correcting range [Ai, Bi] =[A1, B1]=[A0, (A0+B0)/2] and a slicing level Th=(A1+B1)/2=T1, as shown in FIG. 16B, and the array of threshold values is corrected according to the algorithm TALG shown in FIG. 13 except for the processing by the initial setting processor 70. Then, a threshold correcting range [Ai, Bi] and a slicing level Th are set respectively to a threshold correcting range [Ai, Bi]=[A2, B2]=[(A0+B0)/2, B0] and a slicing level Th=(A2+B2)/2=T2, and the array of threshold values is corrected according to the algorithm TALG shown in FIG. 13 except for the processing by the initial setting processor 70. In this manner, the process of correcting the array of threshold values (the process of replacing the position of threshold values) is continued.

By thus continuing the process of correcting the array of threshold values, a bit pattern generated by the first slicing level T0 (generally, a slicing level Th set in the preceding process of correcting the array of threshold values) will not be affected by the results of the subsequent process of correcting the array of threshold values.

Figure 16C:
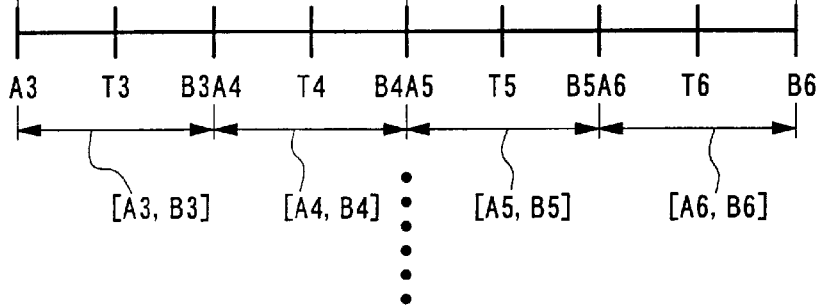

Thereafter, as shown in FIG. 16C, a threshold correcting range [Ai, Bi] and a slicing level Th are determined, and the array of threshold values is corrected according to the algorithm BALG shown in FIG. 12 except for the processing by the initial setting processor 70.

In this fashion, the corrected halftone-dot threshold data 36a where the array of threshold values is corrected in the threshold correcting range [Ai, Bi]=[A0, B0] is obtained.

The corrected halftone-dot threshold data 36a is set as the supercell threshold template 36 (see FIG. 2) in the binary halftone-dot image data generator 20 of the platemaking system 10 shown in FIG. 1.

The corrected halftone-dot threshold data 36a may be stored in a recording medium such as an optical disk or the like, and applied to a commercially available halftone-dot generator such as an image setter or the like. The corrected halftone-dot threshold data 36a may also be downloaded to another work station or the like through a communication network. The corrected halftone-dot threshold data 36a that is generated off-line has its own commercial value.

Still another embodiment (third embodiment) of the present invention will be described below.

In the first and second embodiments, it is assumed that an image represented by halftone-dot image data H will appear as the same halftone-dot image on a photosensitive material M scanned by a laser beam or a recording material such as a film F, a press plate PP, or the like. Actually, however, the same halftone-dot image will not necessarily appear because of the spot shape of the laser beam, the intensity of the laser beam, and the characteristics of the photosensitive material or recording material.

According to the third embodiment, image data to be converted into data in the frequency space by the frequency converting means is not converted into halftone-dot image data H, H' in the first and second embodiments. Rather, brightness levels (lightness, transmittance, and density) on a recording material exposed to a laser beam based on the halftone-dot image data H, H' are simulated, and the brightness data is converted into data in the frequency space for thereby removing low-frequency noise components in a state close to actual output images. The simulation process is referred to as "output machine simulation".

The inventor of the present invention has proposed an output machine simulation process in Japanese laid-open patent publication No. 9-331452.

An amount of exposure (amount of energy) to be given to the photosensitive material M is calculated for each pixel based on the shape of dots to be recorded by the laser beam on the photosensitive material M in the exposure recorder 26 or the CTP output machine 24a (the shape of dots to be recorded is an ideal digital halftone-dot shape which the halftone-dot image data H, H' (which will hereinafter referred to as "halftone-dot image data H") have) and the spot shape of the laser beam (beam diameter) defined by specifications of the laser beam.

Figure 19:
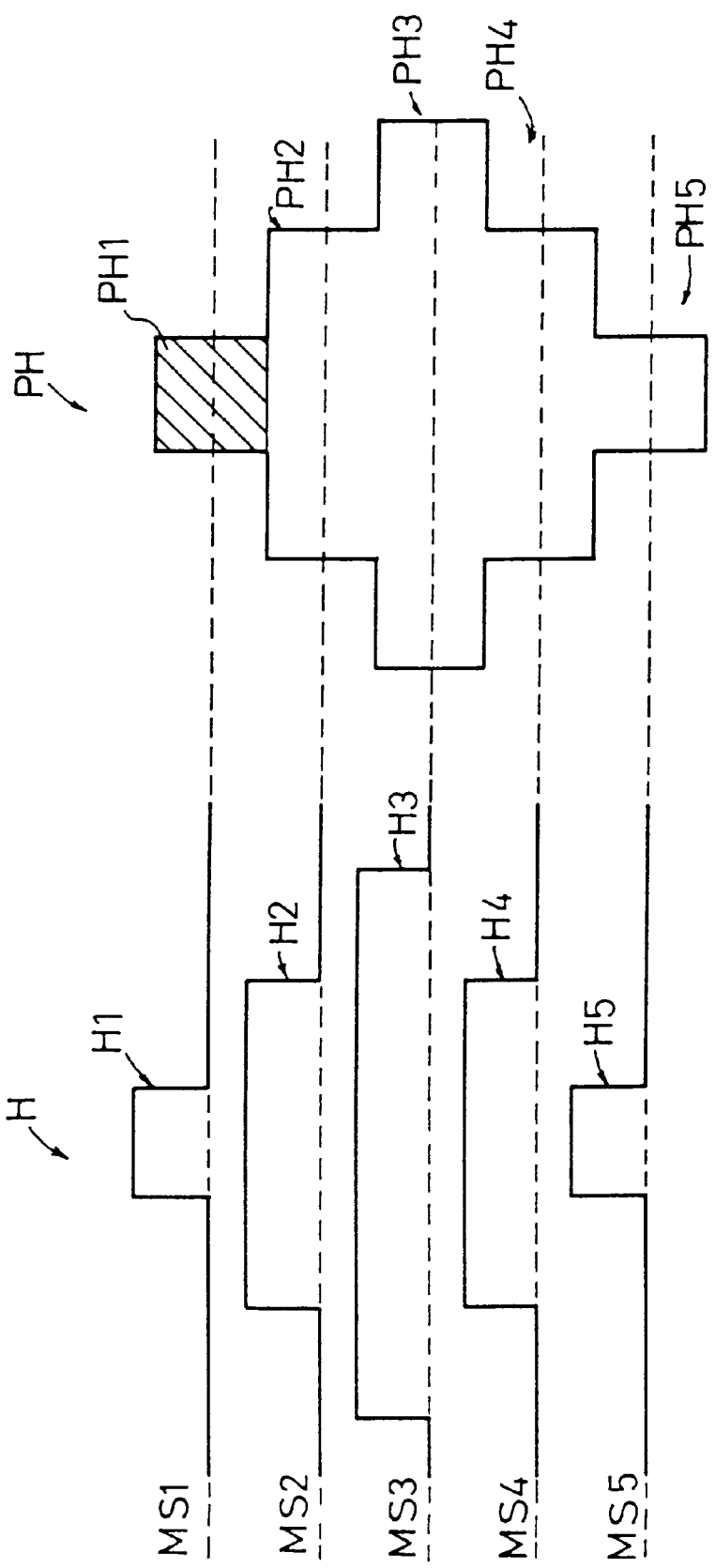
FIG. 19 is a diagram illustrative of the correspondence between halftone-dot image data and a digital halftone dot.

FIG. 19 shows in its right side a recording dot PH (having an ideal digital halftone-dot shape) comprising 13 pixels blackened by the halftone-dot image data H, and also shows in its left side halftone-dot image data H representing an laser ON/OFF signal for forming the recording dot PH. In FIG. 19, there are five main scanning lines MS1–MS2 for producing the recording dot PH with the halftone-dot image data H.

For example, a halftone-dot shape PH1 shown hatched is formed by halftone-dot image data H1 on the main scanning line MS1. Other halftone-dot shapes PH2–PH5 are formed by halftone-dot image data H2-H5 on the respective main scanning lines MS2–MS5. The horizontal axis for the halftone-dot image data H is considered to be a positional axis corresponding to the coordinates of the recording dot PH.

FIG. 20 shows the shape of a laser beam BP simulated by a computer. The laser beam BP has a Gaussian distribution in a region of 30 μm×30 μm. In FIG. 20, a laser beam diameter standardized by $1/e^2$ (e represents the base of natural logarithm) of the maximum value of the amplitude is 13.9 μm. The maximum value of the amplitude is standardized to the value of 1.

Figure 21:
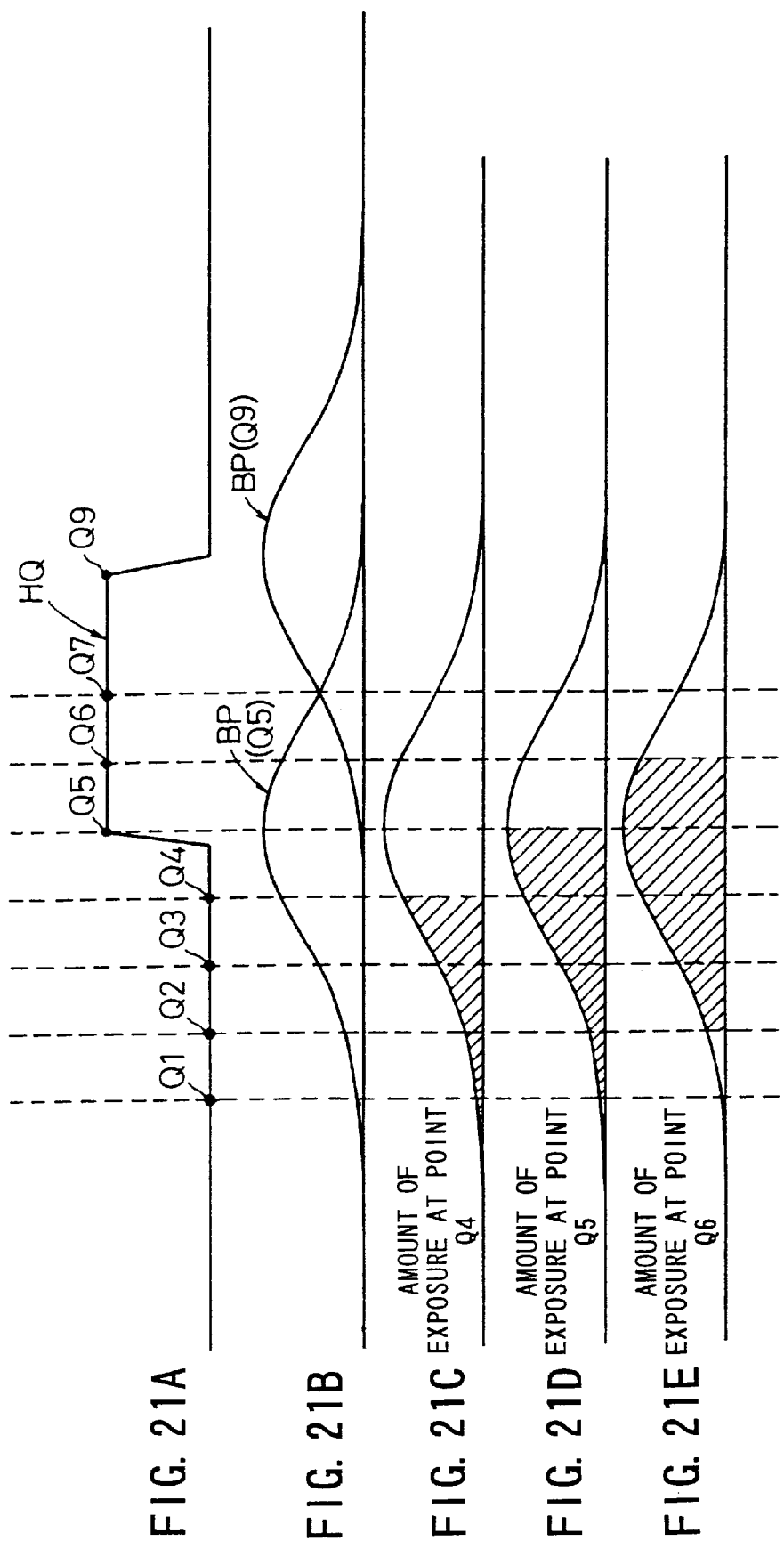
FIGS. 21A through 21E are diagrams illustrative of the calculation of an amount of exposure.

FIGS. 21A through 21E are illustrative of the calculations of an amount of exposure with the halftone-dot image data H. At a point Q5 on a positive-going edge shown in FIG. 21A, a laser beam BP (Q5) is generated as shown in FIG. 21B. At a point Q9 on a negative-going edge shown in FIG. 21A, a laser beam BP (Q9) is eliminated as shown in FIG. 21B.

It should be noted that when the laser beam BP (Q5) is generated at the point Q5, the recording material is also exposed because of the power (energy) of a skirt region of the waveform of the laser beam BP (Q5) at points Q1 through Q4.

Therefore, the amount of exposure at the point Q4 is calculated as an integrated value of a hatched region (from the point Q1 to the point Q4) in FIG. 21C. The amount of exposure at the point Q5 is calculated as an integrated value of a hatched region (from the point Q1 to the point Q5) in FIG. 21D. The amount of exposure at the point Q6 is calculated as an integrated value of a hatched region (from the point Q2 to the point Q6) in FIG. 21E. The integrating range for calculating the amount of exposure at the point Q6 is the hatched region (from the point Q2 to the point Q6) in FIG. 21E, or stated otherwise, excludes the range from the point Q1 to the point Q2 because since the laser beam BP (Q9) is eliminated at the negative-going edge at the point Q9, no exposure is made at a skirt region of the waveform of the laser beam BP (Q9) shown in FIG. 21B, which lies leftward of the point Q6, i.e., on the trailing side of the point Q6 with respect to the direction of travel of the laser beam BP.

In this manner, the amount of exposure is calculated for each of the main scanning lines MS1 through MS5 shown in FIG. 19, i.e., for each of the halftone-dot image data H1–H5. Actually, when the laser beam BP is generated and eliminated on the basis of the halftone-dot image data H shown in FIG. 19, i.e., at the positive- and negative-going edges of the laser drive signal, the generation and elimination of the laser beam BP is subject to delays causing a progressive increase in the amplitude of the laser beam BP and a progressive reduction in the amplitude of the laser beam BP, and hence the amount of exposure should preferably be calculated taking such delays into account.

The calculated amount of exposure for the halftone-dot image data H is then converted into a density. Specifically, a density is determined from a characteristic curve plotted when an image formed on a photosensitive material M that is exposed to a laser beam BP having a desired wavelength is developed under the developing conditions of the automatic developing machine 28. The characteristic curve is stored as a lookup table in a computer memory (not shown).

Figure 22:
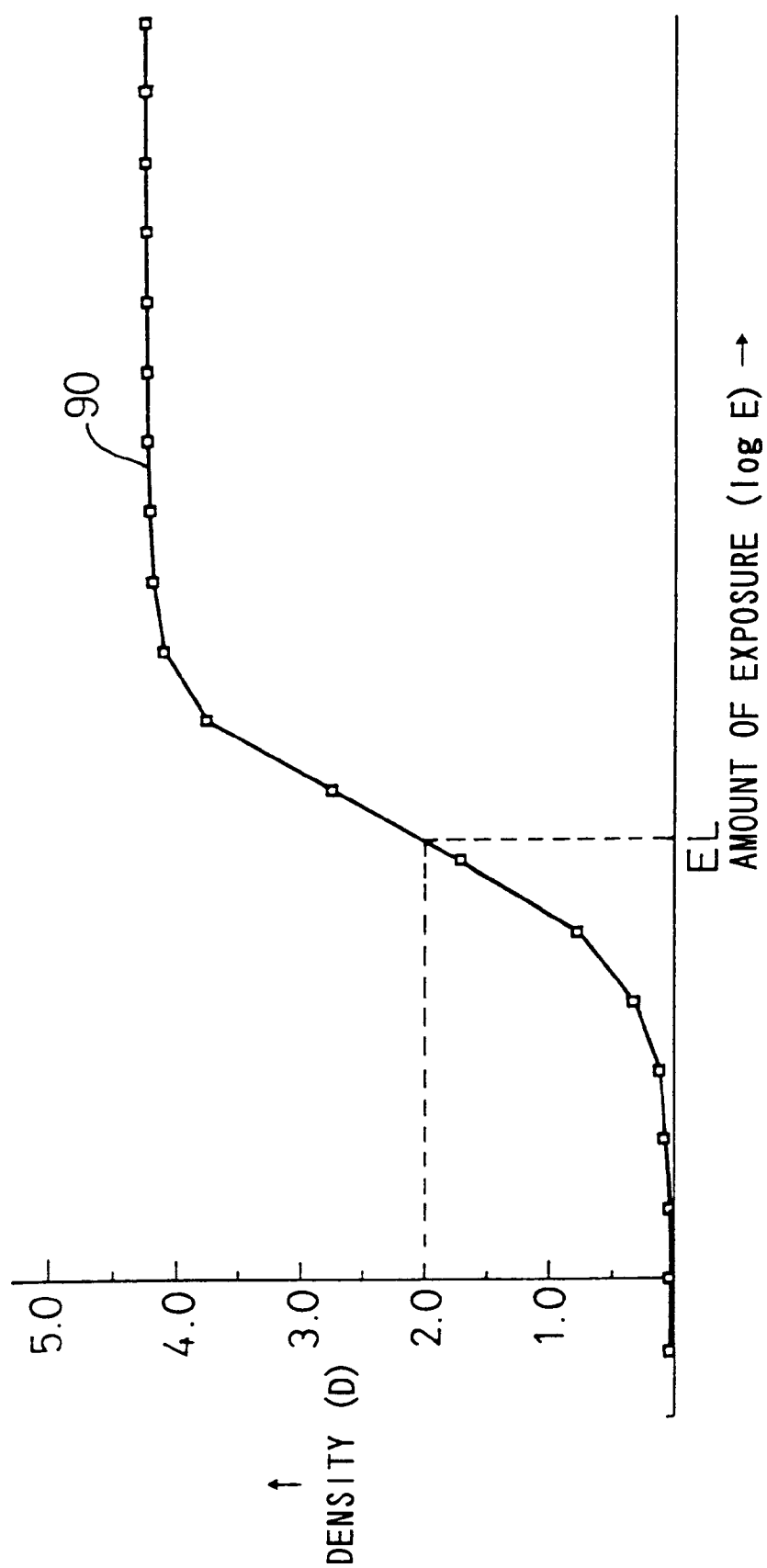
FIG. 22 is a diagram showing the amount-of-exposure to density conversion characteristics of a photosensitive material.

FIG. 22 shows such a characteristic curve (generally called a photosensitive material characteristic curve or a gamma curve) 90 representing the density D with respect to the amount of exposure logE. A similar characteristic curve may be determined in advance with respect to the CTP output machine 24a.

If the amount of exposure logE has a value of logE=EL, then the density D is D=2.0 as shown by the characteristic curve 90. Therefore, the amount of exposure at each pixel position of the halftone-dot image data H can be determined from the characteristic curve 90.

Figure 23:
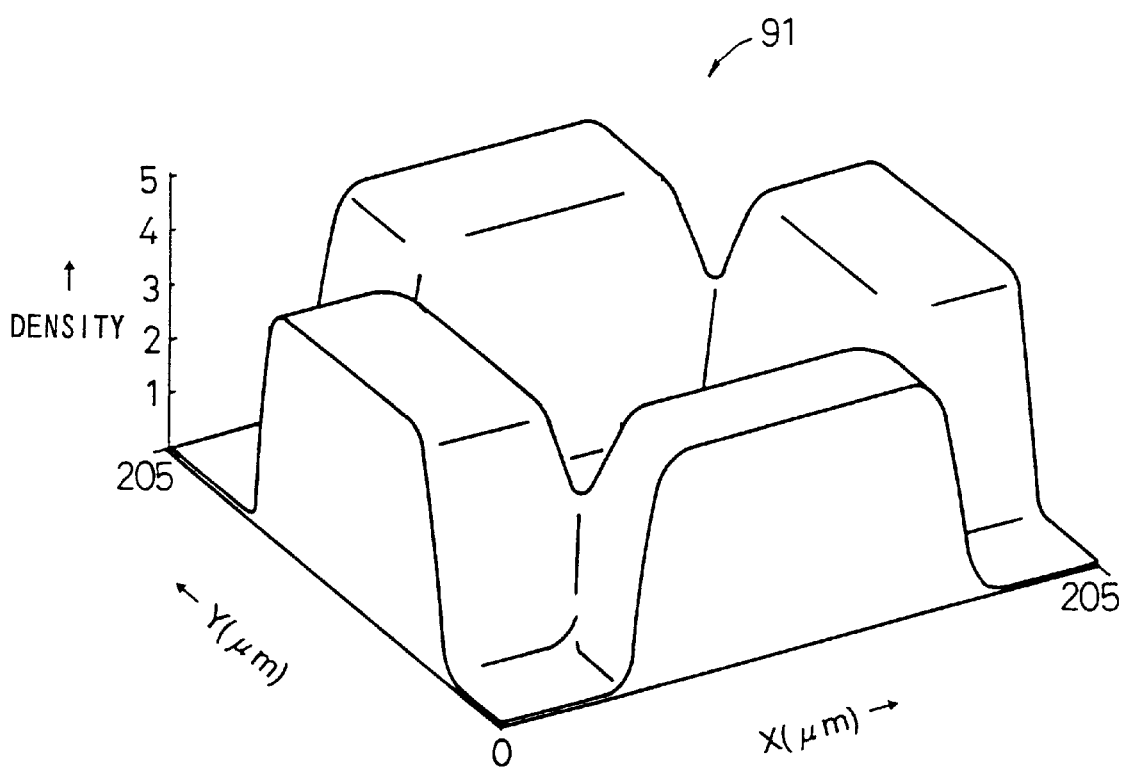
FIG. 23 is a diagram showing a density distribution at the time a halftone percentage is 50%.

FIG. 23 shows a simulated pattern of densities determined from amounts of exposure. Specifically, FIG. 23 schematically shows a density distribution in a region 91 having a size of 205 (=145×√2) μm×205 μm, of the halftone-dot image data H.

The obtained density data (hereinafter referred to as "halftone-dot density data) of each of the pixels corresponding to the halftone-dot image data H is then converted into data S1, S1' in the frequency space by the fast Fourier transform unit 40 according to the algorithms BALG, TALG shown in FIGS. 12 and 13, and then data S2, S2' including low-frequency noise components whose frequencies are lower than the fundamental frequency component of the halftone dots are extracted from the data S1, S1'. The extracted data S2, S2' including low-frequency noise components in the frequency space are inversely converted into noise image data N, N' in the position space. Then, pixels in the original halftone-dot image data H, H' in those positions which correspond to the pixels including the noise components in the noise image data N, N' are corrected such that the noise components will be reduced, for thereby producing corrected halftone-dot threshold data 36a.

According to the third embodiment, it is possible to obtain the corrected halftone-dot image data Ha and the corrected halftone-dot threshold data 36a which have been produced taking the characteristics of the output machine into account.

With the arrangement of the present invention, as described above, halftone-dot image data in a position space or density distribution data generated when the halftone-dot image data is converted taking the characteristics of an output machine and a recording material into account is converted into data in a frequency space, and then low-frequency component s are extracted from the data in the frequency space. Thereafter, noise image data produced when the low-frequency components are inversely converted and the halftone-dot image data are compared with each other, and the array of pixels of the halftone-dot image data or the array of threshold values of halftone-dot threshold data for generating the halftone-dot image data is corrected. Such a novel process makes it possible to reduce low-frequency noise components on a halftone-dot image which are generated due to an interference between the output resolution and the frequency of the halftone dots (screen ruling).

Specifically, after the halftone-dot image data in the position space is converted into the data in the frequency space, and data including the low-frequency noise components whose frequency is lower than the fundamental frequency component of the halftone dots is extracted from the data in the frequency space. The extracted data including the low-frequency noise components is then inversely converted into image data in the position space. The pixels of the halftone-dot image data in those positions which correspond to the pixels including the noise components in the inversely converted image data are corrected such that the noise components will be reduced.

The process of correcting the pixels of the halftone dot image data in those positions which correspond to the pixels including the noise components in the inversely converted image data such that the noise components will be reduced is a process in the position space, and hence can accurately be carried out. A halftone-dot image generated by the corrected halftone-dot image data contains almost no low-frequency noise components.

When the data including the low-frequency noise components is to be extracted, it may be weighted by the human vision characteristics for increasing the accuracy of the correcting process in the position space, with the result that low-frequency noise components can be reduced more effectively in the halftone-dot image.

The basic principles of the present invention are applicable to not only the halftone-dot image data, but also halftone-dot threshold data (threshold template) taking the screen ruling, the screen angle, and the dot shape into account.

More specifically, the central value of a predetermined threshold correcting range and halftone-dot threshold data to be corrected are compared with each other to convert the halftone-dot threshold data into halftone-dot image data. The halftone-dot image data is then converted into data in the frequency space, and data including low-frequency noise components whose frequency is lower than the fundamental frequency component of the halftone dots is extracted from the data in the frequency space. The data including the low-frequency noise components is then converted into image data (noise image data) in the position space. The noise image data and the halftone-dot image data are compared with other within the threshold correcting range to select a pair of threshold values to be selected and replace the selected pair of threshold values, for thereby generating corrected halftone-dot threshold data.

In this manner, the halftone-dot threshold data itself has an array of threshold values which makes it difficult to generate low-frequency noise components.

After a pair of threshold values to be replaced first is determined, each of upper and lower portions of the threshold correcting range is reduced to half, and the above process is repeated in each of the reduced threshold correcting ranges until replacement pixels are no longer present. Thus, it is possible to produce halftone-dot threshold data with the corrected array of threshold values (the position of threshold values) which makes it difficult to generate low-frequency noise components.

For converting the halftone-dot image data in the position space into the data in the frequency space, the amount of exposure for each of the pixels of the halftone dot image data in the position space is calculated on the basis of the shape of dots to be recorded on a recording material with a recording beam that is modulated, i.e., turned on and off, based on the halftone-dot image data in the position space, and the diameter of the recording beam. Then, the density characteristics of the recording material are referred to on the basis of the calculated amount of exposure for each of the pixels, thereby determining the density for each of the halftone dots. Halftone-dot density data represented by the determined density for each of the halftone dots is converted into data in the frequency space. Consequently, it is possible to obtain halftone-dot image data or halftone-dot threshold data capable of reducing low-frequency noise components in a manner to match the characteristics of the output device.

Although certain preferred embodiments of the present invention have been shown and described in detail, it should be understood that various changes and modifications may be made therein without departing from the scope of the appended claims.

What is claimed is:

1. A method of correcting halftone-dot image data, comprising the steps of:

converting halftone-dot image data in a position space into data in a frequency space;

extracting data including low-frequency noise components whose frequency is lower than the fundamental frequency component of halftone dots from said data in the frequency space;

inversely converting the extracted data including the frequency noise components into image data in the position space; and correcting pixels of said halftone-dot image data in positions which correspond to pixels including the noise components in the inversely converted image data such that the noise components will be reduced.

2. A method according to claim 1, wherein said converting halftone-dot image data in a position space into data in a frequency space, comprises the steps of:

calculating the amount of exposure for each of the pixels of the halftone-dot image data in the position space on the basis of the shape of dots to be recorded on a recording material with a recording beam that is modulated based on the halftone-dot image data in the position space, and the diameter of the recording beam, referring to the density characteristics of the recording material on the basis of the calculated amount of exposure for each of the pixels, thereby determining the density for each of the halftone dots, and converting halftone-dot density data represented by the determined density for each of the halftone dots into data in the frequency space.

3. A method according to claim 1, wherein said step of extracting data including low-frequency noise components, comprises the step of:

weighting the data including the low-frequency noise components with human vision characteristics.

4. A method according to claim 2, wherein said step of extracting data including low-frequency noise components, comprises the step of:

weighting the data including the low-frequency noise components with human vision characteristics.

5. A method according to claim 1, wherein said halftone-dot image data comprises binary halftone-dot image data, and said step of correcting pixels of said halftone-dot image data in positions which correspond to pixels including the noise components in the inversely converted image data such that the noise components will be reduced, comprises the steps of:

extracting a pair of a peak pixel at a maximum value of density and a peak pixel at a minimum value of density from the noise components in the inversely converted image data, and inverting one of a pair of pixels in said halftone-dot image data in positions corresponding to the pair of peak pixels from a blackened pixel to a non-blackened pixel and the other pixel from a non-blackened pixel to a blackened pixel, thereby to correct said halftone-dot image data.

6. An apparatus for correcting halftone-dot image data, comprising:

frequency converting means for converting halftone-dot image data in a position space into data in a frequency space;

a low-pass filter for extracting data including low-frequency noise components whose frequency is lower than the fundamental frequency component of halftone dots from said data in the frequency space;

inverse frequency converting means for inversely converting the extracted data including the frequency noise components into image data in the position space; and correcting means for correcting pixels of said halftone-dot image data in positions which correspond to pixels including the noise components in the inversely converted image data such that the noise components will be reduced.

7. An apparatus according to claim 6, wherein said low-pass filter includes means for weighting the data including the low-frequency noise components with human vision characteristics.

8. An apparatus according to claim 6, wherein said halftone-dot image data comprises binary halftone-dot image data, and said correcting means comprises:

means for extracting a pair of a peak pixel at a maximum value of density and a peak pixel at a minimum value of density from the noise components in the inversely converted image data, and inverting one of a pair of pixels in said halftone-dot image data in positions corresponding to the pair of peak pixels from a blackened pixel to a non-blackened pixel and the other pixel from a non-blackened pixel to a blackened pixel, thereby to correct said halftone-dot image data.

9. A method of correcting halftone-dot threshold data to correct the position of threshold values in halftone-dot threshold data which takes a screen ruling, a screen angle, and a dot shape into account and which takes a predetermined numerical range, comprising the steps of:

(a) setting a threshold correcting range to correct the position of threshold values, within said numerical range represented by threshold values of said halftone-dot threshold data;

(b) comparing a central value of said threshold correcting range and each of the threshold values of said halftone-dot threshold data to generate halftone-dot image data;

(c) converting the halftone-dot image data in a position space into data in a frequency space;

(d) extracting data including low-frequency noise components whose frequency is lower than the fundamental frequency component of halftone dots from said data in the frequency space;

(e) inversely converting the extracted data including the frequency noise components into image data in the position space; and (f) selecting a pair of threshold values to be replaced in said halftone-dot threshold data and replacing the selected threshold values to generate halftone-dot threshold data where the position of threshold values is corrected;

said step (f) comprising the steps of:

regarding one of the pair of threshold values as a threshold value in said halftone-dot threshold data in a position corresponding to a pixel having a minimum low-frequency noise component among the image data inversely converted in said step (e), in a region of non-blackened pixels of said halftone-dot image data produced in said step (b), on the assumption that threshold values in said halftone-dot threshold data which correspond to said non-blackened pixels are threshold values in said threshold correcting range; and regarding the other of the pair of threshold values as a threshold value in said halftone-dot threshold data in a position corresponding to a pixel having a maximum low-frequency noise component among the image data inversely converted in said step (e), in a region of non-blackened pixels of said halftone-dot image data produced in said step (b), on the assumption that threshold values in said halftone-dot threshold data which correspond to said blackened pixels are threshold values in said threshold correcting range.

10. A method according to claim 9, wherein said step (c) comprises the steps of:

calculating the amount of exposure for each of the pixels of the halftone-dot image data in the position space on the basis of the shape of dots to be recorded on a recording material with a recording beam that is modulated based on the halftone-dot image data in the position space, and the diameter of the recording beam, referring to the density characteristics of the recording material on the basis of the calculated amount of exposure for each of the pixels, thereby determining the density for each of the halftone dots, and converting halftone-dot density data represented by the determined density for each of the halftone dots into data in the frequency space.

11. A method according to claim 9, wherein said step (d) comprises the step of:

weighting the data including the low-frequency noise components with human vision characteristics.

12. A method according to claim 10, wherein said step (d) comprises the step of:

weighting the data including the low-frequency noise components with human vision characteristics.

13. A method according to claim 9, further comprising the steps of:

(g) after said step (f), changing said threshold correcting range in said step (a) to a new threshold correcting range having a minimum value of said threshold correcting range in said step (b) as a minimum value thereof and said central value of said threshold correcting range in said step (b) as a maximum value thereof, and a new threshold correcting range having said central value of said threshold correcting range in said step (b) as a minimum value thereof and a maximum value of said threshold correcting range in said step (b) as a maximum value thereof;

said step (b) comprising the step of, after said step (g), comparing central values of the respective new threshold correcting ranges with each of the thresholds of the halftone-dot threshold data corrected in said step (f) thereby to generate the halftone-dot image data; and (h) repeating said steps (b), (c), (d), (e), (f), and (g) until any pair of threshold values replaceable in said step (f) is no longer available, for thereby producing final corrected halftone-dot threshold data.

14. A method according to claim 10, further comprising the steps of:

(g) after said step (f), changing said threshold correcting range in said step (a) to a new threshold correcting range having a minimum value of said threshold correcting range in said step (b) as a minimum value thereof and said central value of said threshold correcting range in said step (b) as a maximum value thereof, and a new threshold correcting range having said central value of said threshold correcting range in said step (b) as a minimum value thereof and a maximum value of said threshold correcting range in said step (b) as a maximum value thereof;

said step (b) comprising the step of, after said step (g), comparing central values of the respective new threshold correcting ranges with each of the thresholds of the halftone-dot threshold data corrected in said step (f) thereby to generate the halftone-dot image data; and (h) repeating said steps (b), (c), (d), (e), (f), and (g) until any pair of threshold values replaceable in said step (f) is no longer available, for thereby producing final corrected halftone-dot threshold data.

15. A method according to claim 11, further comprising the steps of: (g) after said step (f), changing said threshold correcting range in said step (a) to a new threshold correcting range having a minimum value of said threshold correcting range in said step (b) as a minimum value thereof and said central value of said threshold correcting range in said step (b) as a maximum value thereof, and a new threshold correcting range having said central value of said threshold correcting range in said step (b) as a minimum value thereof and a maximum value of said threshold correcting range in said step (b) as a maximum value thereof;

said step (b) comprising the step of, after said step (g), comparing central values of the respective new threshold correcting ranges with each of the thresholds of the halftone-dot threshold data corrected in said step (f) thereby to generate the halftone-dot image data; and (h) repeating said steps (b), (c), (d), (e), (f), and (g) until any pair of threshold values replaceable in said step (f) is no longer available, for thereby producing final corrected halftone-dot threshold data.

16. A method according to claim 12, further comprising the steps of:

(g) after said step (f), changing said threshold correcting range in said step (a) to a new threshold correcting range having a minimum value of said threshold correcting range in said step (b) as a minimum value thereof and said central value of said threshold correcting range in said step (b) as a maximum value thereof, and a new threshold correcting range having said central value of said threshold correcting range in said step (b) as a minimum value thereof and a maximum value of said threshold correcting range in said step (b) as a maximum value thereof;

said step (b) comprising the step of, after said step (g), comparing central values of the respective new threshold correcting ranges with each of the thresholds of the halftone-dot threshold data corrected in said step (f) thereby to generate the halftone-dot image data; and (h) repeating said steps (b), (c), (d), (e), (f), and (g) until any pair of threshold values replaceable in said step (f) is no longer available, for thereby producing final corrected halftone-dot threshold data.

17. A method of correcting threshold values in threshold matrix data used in obtaining halftone-dot image data by processing continuous-tone image data to be binary or multivalued data, comprising the steps of:

preparing threshold values in threshold matrix data in a conventional and arbitrary method for generating halftone-dot gradation data having a desired screen ruling, screen angle, and dot shape;

converting halftone-dot image data in a position space generated in a predetermined gradation value into data in a frequency space;

extracting data including low-frequency noise components whose frequency is lower than the fundamental frequency component of halftone dots from said data in the frequency space;

inversely converting the extracted data including the low-frequency noise components into image data in the position space; and correcting said threshold values for correcting pixels of said halftone-dot image data in positions which correspond to pixels including the noise components in the inversely converted image data such that the noise components will be reduced.

18. A method according to claim 17, wherein said step of correcting said threshold values is further executed with another predetermined gradation value.

19. A method according to claim 17, wherein said step of correcting said threshold values comprises the step of:

reducing the noise components by exchanging two of said threshold values with each other.

20. A method according to claim 17, wherein said step of converting halftone-dot image data in a position space generated in a predetermined gradation value into data in a frequency space comprises the steps of:

calculating the amount of exposure for each of the pixels of the halftone-dot image data in the position space on the basis of the shape of dots to be recorded on a recording material with a recording beam that is modulated based on the halftone-dot image data in the position space, and the diameter of the recording beam, referring to the density characteristics of the recording material on the basis of the calculated amount of exposure for each of the pixels, thereby determining the density for each of the halftone dots, and converting halftone-dot density data represented by the determined density for each of the halftone dots into data in the frequency space.

21. A method according to claim 17, wherein said step of extracting data including low-frequency noise components in the frequency space comprises the step of:

weighting the data including the low-frequency noise components with human vision characteristics.

22. A method according to claim 20, wherein said step of extracting data including low-frequency noise components in the frequency space comprises the step of:

weighting the data including the low-frequency noise components with human vision characteristics.

* * * * *